(12) United States Patent
Moghe et al.

(10) Patent No.: US 11,728,653 B2
(45) Date of Patent: Aug. 15, 2023

(54) AUTONOMOUS REGULATION OF GRID EDGE DEVICES

(71) Applicant: SENTIENT ENERGY TECHNOLOGY, LLC, Wichita, KS (US)

(72) Inventors: Rohit Moghe, Santa Clara, CA (US); Kaveh Rahimi, Santa Clara, CA (US); Hong Chun, Santa Clara, CA (US)

(73) Assignee: SENTIENT ENERGY TECHNOLOGY, LLC, Wichita, KS (US)

( * ) Notice: Subject to any disclaimer, the term of this patent is extended or adjusted under 35 U.S.C. 154(b) by 470 days.

(21) Appl. No.: 16/890,935

(22) Filed: Jun. 2, 2020

(65) Prior Publication Data

US 2020/0403411 A1    Dec. 24, 2020

Related U.S. Application Data

(60) Provisional application No. 62/862,563, filed on Jun. 17, 2019.

(51) Int. Cl.
| | |
|---|---|
| *H02J 3/38* | (2006.01) |
| *H02J 13/00* | (2006.01) |
| *G05B 19/04* | (2006.01) |
| *H02J 3/28* | (2006.01) |
| *G05B 19/042* | (2006.01) |

(52) U.S. Cl.
CPC ............ *H02J 3/381* (2013.01); *G05B 19/042* (2013.01); *H02J 3/28* (2013.01); *H02J 13/00002* (2020.01); *G05B 2219/2639* (2013.01); *H02J 2300/24* (2020.01)

(58) Field of Classification Search
None
See application file for complete search history.

(56) References Cited

U.S. PATENT DOCUMENTS

| | | | |
|---|---|---|---|
| 8,588,991 B1 * | 11/2013 | Forbes, Jr. ........ | H02J 13/00006 700/297 |
| 10,096,998 B2 * | 10/2018 | Sun .......................... | H02J 3/16 |

(Continued)

OTHER PUBLICATIONS

Gupta et al., "Using Secondary VAr Controllers to Enhance Integrated Volt-VAr Optimization Benefits", May 2019, 2019 IEEE Canadian Conference of Electrical and Computer Engineering (CCECE). (Year: 2019).*

(Continued)

*Primary Examiner* — Mohammad Ali
*Assistant Examiner* — Kelvin Booker

(57) ABSTRACT

Systems and methods for autonomously regulating grid edge devices (GEDs) are disclosed. In one embodiment, a method may include obtaining a first setpoint voltage for a GED. The GED may be implemented on a secondary side of a distribution line providing electricity for a consumer. The method may also include generating an average VAR value based on VARs generated by the GED over a first time interval. The method may include generating an average voltage value based on voltage received by the GED over a first time interval. The method may include adjusting the first setpoint voltage to a second setpoint voltage based on a difference between the average voltage value and the first setpoint voltage exceeding a voltage threshold value.

20 Claims, 24 Drawing Sheets

(56) References Cited

U.S. PATENT DOCUMENTS

| | | | | |
|---|---|---|---|---|
| 2013/0096724 A1* | 4/2013 | Divan | ................... | G05B 13/02 |
| | | | | 700/286 |
| 2013/0138260 A1* | 5/2013 | Divan | ..................... | H02J 3/16 |
| | | | | 700/298 |
| 2014/0277788 A1* | 9/2014 | Forbes, Jr. | ........ | H02J 13/00017 |
| | | | | 700/286 |
| 2015/0094968 A1* | 4/2015 | Jia | ........................ | G01R 21/133 |
| | | | | 702/60 |
| 2015/0236508 A1* | 8/2015 | Divan | ..................... | H02J 3/16 |
| | | | | 700/295 |
| 2015/0311718 A1* | 10/2015 | Divan | ..................... | H02J 3/18 |
| | | | | 323/208 |
| 2016/0094034 A1* | 3/2016 | Divan | ................... | H02M 7/42 |
| | | | | 307/11 |
| 2017/0005515 A1* | 1/2017 | Sanders | ..................... | H02J 3/14 |
| 2018/0218525 A1* | 8/2018 | Jagerson, Jr. | .......... | G06Q 10/00 |
| 2018/0226799 A1* | 8/2018 | Baker | ................... | G06Q 50/06 |

OTHER PUBLICATIONS

Asono et al., "On the Interplay between SVCs and Smart Inverters for Managing Voltage on Distribution Networks", Aug. 2019. (Year: 2019).*

Ashourian et al., "Controlling and Modeling Power-Electronic Interface DERs in Islanding Mode Operation Micro Grid", Sep. 2011, 2011 IEEE Symposium on Industrial Electronics and Applications (ISIEA2011). (Year: 2011).*

Smith et al., "Reducing Peak Demand Through Distributed Grid Edge Control", Apr. 23-26, 2017, 2017 IEEE Rural Electric Power Conference. (Year: 2017).*

\* cited by examiner

AUTONOMOUS REGULATION OF GRID EDGE DEVICES

RELATED APPLICATION

The present application claims priority to U.S. Patent Application No. 62/862,563, filed Jun. 17, 2019 and titled "SYSTEMS AND METHODS FOR AUTONOMOUSLY REGULATING GRID EDGE DEVICES," which is incorporated herein by reference in its entirety.

FIELD

Various embodiments generally relate to grid edge devices (GEDs). More particularly, various embodiments are related to autonomously regulating GEDs.

BRIEF SUMMARY OF THE DISCLOSURE

Embodiments of the disclosure are directed to systems and methods for autonomously regulating grid edge devices (GEDs).

In one embodiment, a computer-implemented method for autonomously regulating grid edge devices (GEDs) may be implemented in a computer system including a non-transient electronic storage and one or more physical computer processors. The computer-implemented method may include obtaining a first setpoint voltage for a GED. The GED may be implemented on a secondary side of a distribution line providing electricity for a consumer. The computer-implemented method may include generating an average VAR value based on VARs generated by the GED over a first time interval. The computer-implemented method may include generating an average voltage value based on voltage received by the GED over a first time interval. The computer-implemented method may include adjusting the first setpoint voltage to a second setpoint voltage based on a difference between the average voltage value and the first setpoint voltage exceeding a voltage threshold value.

In embodiments, the GED includes a sensor measuring an environmental parameter.

In embodiments, the sensor includes one or more of a clock, a temperature sensor, a current sensor, a VAR sensor, and a voltage sensor.

In embodiments, the GED includes one or more of a photovoltaic, a VAR device, an inverter, and an energy storage device.

In embodiments, the second setpoint voltage is bounded by a minimum voltage threshold value and a maximum voltage threshold value.

In embodiments, adjusting the first setpoint voltage to the second setpoint voltage includes one or more steps. One step may include applying a first equation to determine the second setpoint voltage when the average VAR value is greater than a maximum VAR threshold value. The first equation may be defined by $$\frac{dV_{sp}}{dt} = -M_v(V_{sp} - V_{wavg})$$

where $$\frac{dV_{sp}}{dt}$$

represents the rate of change of the first setpoint voltage as a function of time, $M_v$ represents the speed of VAR response to the second setpoint voltage, $V_{sp}$ represents the first setpoint voltage, and $V_{wavg}$ represents the average voltage value.

In embodiments, adjusting the first setpoint voltage to the second setpoint voltage includes applying a second equation to determine the second setpoint voltage when the average VAR value is less than a minimum VAR threshold value. The second equation may be defined by $$\frac{dV_{sp}}{dt} = -M_v(V_{sp} - b_{min}V_{wavg})$$

where $$\frac{dV_{sp}}{dt}$$

represents the rate of change of the first setpoint voltage as a function of time, $M_v$ represents the speed of VAR response to the second setpoint voltage, $V_{sp}$ represents the first setpoint voltage, $b_{min}$ represents a bias term to improve reducing the average VAR value, and $V_{wavg}$ represents the average voltage value.

The computer-implemented method may further include, based on a current real power value and a current time, adjusting the second setpoint voltage to a third setpoint voltage based on the second setpoint voltage and a setpoint voltage threshold value.

The computer-implemented method may further include, when the setpoint voltage is greater than or equal to about the setpoint voltage threshold plus a minimum setpoint voltage threshold, adjusting the third setpoint voltage to a fourth setpoint voltage, based on the third setpoint voltage and the setpoint voltage threshold value.

The computer-implemented method may further include, when the average VAR value is less than a minimum VAR threshold value and the current setpoint voltage is less than the third setpoint voltage, adjusting the third setpoint voltage to a fourth setpoint voltage. The fourth setpoint voltage is based on the third setpoint voltage minus half of the setpoint voltage threshold value.

In another embodiment, a computer-implemented method for autonomously regulating GEDs may be implemented in a computer system including a non-transient electronic storage and one or more physical computer processors. The computer-implemented method may include obtaining a first setpoint voltage for a GED. The GED may be implemented on a secondary side of a distribution line providing electricity for a consumer. The computer-implemented method may also include generating an average real power flow value based on power received by the GED over a time interval. The computer-implemented method may include generating an average voltage value based on voltage received by the GED over the time interval. The computer-implemented method may include adjusting the first setpoint voltage to a second setpoint voltage based on a change in real power.

In embodiments, the GED includes a sensor measuring an environmental parameter.

In embodiments, the sensor includes one or more of a clock, a temperature sensor, a current sensor, a VAR sensor, and a voltage sensor.

In embodiments, the GED includes one or more of a photovoltaic, a VAR device, a UPFC device, an inverter, and an energy storage device.

In embodiments, the second setpoint voltage is bounded by an upper threshold based on a low voltage usage value and a lower threshold based on a high voltage usage value.

In embodiments, adjusting the first setpoint voltage to the second setpoint voltage includes applying a first equation to determine the second setpoint voltage when the change in real power is positive. The first equation is defined by $$V_{sp} = V_{avg} + \frac{P}{kW_{avg}} K_{p+}$$

where $V_{sp}$ represents the second setpoint voltage, $V_{avg}$ represents the average voltage, P represents the real power flow, $kW_{avg}$ represents the average real power flow, and $$K_{p+} = \left(\frac{126 - V_{avg}}{1.25 \times kWmax}\right) kW_{avg}.$$

In embodiments, adjusting the first setpoint voltage to the second setpoint voltage includes applying a second equation to determine the second setpoint voltage when the change in real power is negative. The second equation is defined by $$V_{sp} = V_{avg} + \frac{P}{kW_{avg}} K_{p-}$$

where $V_{sp}$ represents the second setpoint voltage, $V_{avg}$ represents the average voltage, P represents the real power flow, $kW_{avg}$ represents the average real power flow, and $$K_{p-} = \left(\frac{V_{avg} - 114}{1.25 \times kWmax}\right) kW_{avg}.$$

In another embodiment, a computer-implemented method for autonomously regulating GEDs may be implemented in a computer system including a non-transient electronic storage and one or more physical computer processors. The computer-implemented method may include obtaining one or more grid parameters. The computer-implemented method may include generating one or more GED parameters based on the one or more grid parameters over a time interval. The computer-implemented method may include adjusting the first setpoint voltage to a second setpoint voltage based on a change in at least one of the one or more grid parameters and the one or more GED parameters.

In embodiments, the one or more grid parameters include one or more of time interval, a first setpoint voltage, VARs, a minimum VAR threshold, a maximum VAR threshold, a bias term, a setpoint voltage threshold, a response speed of the GED, a maximum setpoint voltage threshold, a minimum setpoint voltage threshold, a current, a time of day, a number of switching operations, and a temperature.

In embodiments, the one or more average parameters include one or more of an average voltage value, an average current value, an average real power flow value, and an average VAR value.

The computer-implemented method may further include adjusting the second setpoint voltage to a third setpoint voltage based on a change in at least one of the one or more grid parameters and the one or more GED parameters.

In one embodiment, a computer-implemented method for autonomously activating GEDs may be implemented in a computer system including a non-transient electronic storage and one or more physical computer processors. The computer-implemented method may include obtaining one or more grid parameters. The computer-implemented method may also include generating one or more average grid parameters based on the one or more grid parameters over a time interval. The computer-implemented method may include adjusting the first setpoint voltage to a second setpoint voltage based on a change in at least one of the one or more grid parameters and the one or more average grid parameters. The computer-implemented method may include activating one or more GEDs to affect the distribution line. Activating the one or more GEDs may be based on the second setpoint voltage.

In embodiments, the one or more GEDs include a sensor measuring an environmental parameter.

In embodiments, the sensor includes one or more of a clock, a temperature sensor, a current sensor, a VAR sensor, and a voltage sensor.

In embodiments, the GED includes one or more of a photovoltaic, a VAR device, a UPFC device, an inverter, and an energy storage device.

In embodiments, the second setpoint voltage is bounded by a minimum voltage threshold value and a maximum voltage threshold value.

In another embodiment, a computer-implemented method for dynamically adjusting a bandwidth for one or more GEDs may be implemented in a computer system including a non-transient electronic storage and one or more physical computer processors. The computer-implemented method may include obtaining a first bandwidth for the one or more GEDs. The computer-implemented method may include generating an average number of switching operations for the one or more GEDs over a first time interval. The computer-implemented method may include adjusting the first bandwidth to a second bandwidth based on the average number of switching operations.

In embodiments, the second bandwidth is based on the average number of switching operations exceeding a switching threshold.

In embodiments, the switching threshold is based on one or more of a life of the one or more GEDs and a performance of the one or more GEDs.

In one embodiment, a computer-implemented method for dynamically adjusting a power factor for one or more GEDs may be implemented in a computer system including a non-transient electronic storage and one or more physical computer processors. The computer-implemented method may include obtaining a power factor value. The computer-implemented method may include adjusting the amount of reactive power based on the power factor value.

In embodiments, the amount of reactive power is based on $$Q_G' = Q_L(2M+N) - Q_G(2M+N) + Q_{set}$$

where $Q_L$ (2M+N) represents an average load reactive power consumed over 2M+N half cycles, M represents a positive integer, N represents a positive integer, $Q_G$ (2M+N) represents an average reactive power generated over 2M+N half cycles, and $Q_{set}$ represents a reactive power required to maintain the power factor value. where $Q_L$ (2M+N) represents an average load reactive power consumed over 2M+N half cycles, M represents a positive integer, N represents a positive integer, QG (2M+N) represents an average reactive power generated over 2M+N half cycles, and Qset represents a reactive power required to maintain the power factor value.

In another embodiment, a computer-implemented method for dynamically affecting a frequency in the grid using one or more GEDs may be implemented in a computer system including a non-transient electronic storage and one or more physical computer processors. The computer-implemented method may include measuring a current frequency outside of a nominal frequency range. The computer-implemented method may include adjusting an amount of reactive power in the grid to adjust the current frequency within the nominal frequency range.

In embodiments, adjusting the amount of reactive power is based on $$Q_G = \begin{bmatrix} K_Q(af+b)^{\frac{2}{\beta}}, f > f_{nom} \\ -K_Q(af+b)^{\frac{2}{\beta}}, f < f_{nom} \end{bmatrix}$$

where $K_Q$ represents a first constant, a represents a second constant, f represents the current frequency, b represents a third constant, $\beta$ represents a fourth constant, and $f_{nom}$ represents a nominal frequency.

In embodiments, adjusting the amount of reactive power can be delayed based on $$T_d = \frac{K_T}{|f - f_{nom}|}, f > (f_{nom} + \varepsilon) \text{ or } f < (f_{nom} - \varepsilon)$$

where $K_T$ represents a first constant, f represents the current frequency, $f_{nom}$ represents a nominal frequency, and $\varepsilon$ represents a value that, when added with $f_{nom}$, is outside the nominal frequency range.

BRIEF DESCRIPTION OF THE DRAWINGS

The present disclosure, in accordance with one or more various embodiments, is described in detail with reference to the following figures. The figures are provided for purposes of illustration and merely depict typical or example embodiments.

Figure 1:
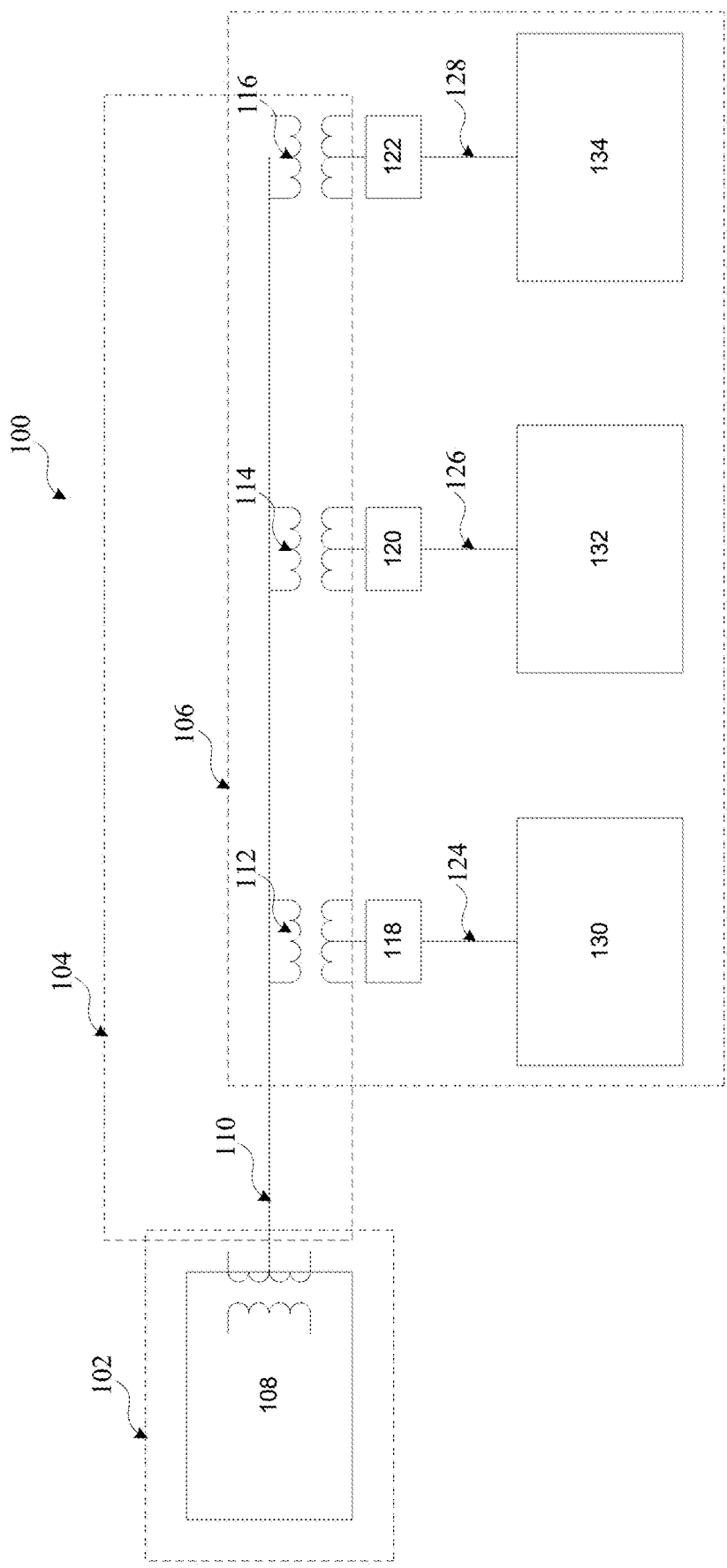
FIG. 1 is a diagram of an example power system with multiple GEDs, in accordance with various embodiments of the present disclosure.

The figures are not exhaustive and do not limit the present disclosure to the precise form disclosed.

DETAILED DESCRIPTION

A primary purpose of voltage control is maintaining acceptable voltage (e.g. in the United States, as per the American National Standards Institute (ANSI) band, the voltage at the service entrant is to be maintained at about 120 volts plus or minus about five percent) at the service entrance of consumers served by a feeder under all possible operating conditions. Electric utilities traditionally maintain distribution system voltage within the acceptable range using transformers with moveable taps that permit voltage adjustments under load. Other methods include de-energized tap changers (DETC) where the transformers are de-energized for changing the tap setting and then re-energized once the tap is changed. When utilizing the DETC method, the tap remains fixed once changed and the voltage is not actively regulated. Voltage regulators located in substations and on the lines, as well as substation transformers are commonly used for voltage control purposes. These transformers can be referred to as Load Tap Changers (LTCB) and are equipped with a voltage-regulating controller that determines whether to raise or lower the transformer tap settings or leave the tap setting unchanged based on "local" voltage and load measurements.

A strategy for distribution feeder design and operation is to establish acceptable voltage conditions for all consumers while meeting certain set objectives which could be reducing energy consumption, reducing peak demand, reducing line losses on the system (in other words maximizing efficiency), reducing voltage loss across the feeder and stabilizing the voltage throughout the feeder. The voltage profile along the distribution feeder, and the flow of VARs on the feeder may be maintained by a combination of voltage regulators and switched capacitor banks installed at various locations on the feeder and in its associated substation. Each voltage regulator includes a controller that raises or lowers the voltage regulator tap position in response to local (e.g., at the device) current, voltage, time of day, or temperature measurements. Similarly, each capacitor bank includes a controller that switches the bank on or off in response to its local measurements. These capacitor banks serve as a source of reactive power that the electric utility can position at any point on the feeder. Installing capacitor banks at strategic locations on the feeder reduces the amount of reactive power supplied by the transmission system, reduces the flow of VARs from the substation to the loads, reduces the current flowing from the transmission and distribution system to serve a given load, reduces the associated electrical losses, and increases the voltage at the point of the capacitor.

In most parts of the world, the penetration of Grid Edge Devices (GEDs), such as, for example, smart inverters is still small, and they are generally engaged with fixed local settings (in the USA, CA Rule 21 and Hawaii Rule 14H) that may not always be the best settings from a system standpoint. One of the highest number of GED deployments has been of the Edge of Network Grid Optimization (ENGO) devices (Secondary VAR Compensators (SVCS)). GEDs may be deployed on a secondary side, or consumer-side, of service transformers. Service transformers may be transformers that provides the final voltage transformation in an electric power distribution system before it is used by a consumer. GEDs have been deployed with either a fixed setting or a schedule of setpoints. In some cases, setpoint mismatch between the LTC and GEDs devices where some GEDs were found to inject all 10 kVARs, while in other cases they injected 0 VARs or a negligible amount of VARs. A setpoint may refer to a selected, or desired, parameter value the one or more GEDs regulate a corresponding parameter (e.g., voltage) toward. The GEDs may use VARs to regulate the parameter.

Fixed settings for all GEDs in the system can work for most scenarios, however, over- and under-injection of control effort (e.g., VARs or Volts) can still occur. In addition, fixed settings can cause utility engineer dependence. GEDs may rely on a utility engineer to pre-program the GEDs with a setpoint schedule. If the utility engineer forgets to program the GEDs or gets busy, the GEDs will operate with an old setting, causing the system to experience setpoint mismatch problems.

In addition, fixed settings may depend on a utility schedule. If the setpoint schedule was programmed but in the end the utility decides to change the timing of LTC reduction or changes are made to the voltage reduction realized, a setpoint mismatch problem can occur.

Moreover, fixed settings may cause dynamic changes in photovoltaic (PV) generation. Because solar PV is an intermittent source of power, a fixed setting may not solve issues that the GEDs are trying to mitigate.

Fixed settings cannot account for changes in PV penetration. As more consumers install solar PV on their rooftops, the penetration of PV on the system causes a change in system kW flows. This requires optimization of GED settings on a regular basis, which can be onerous for utilities.

Finally, fixed settings can cause communication issues. Lack of communication with a certain set of GEDs can cause those devices to get stuck with the fixed settings (e.g., setpoint or schedule). If the utility decides to change the schedule while a communication problem exists with a few devices, different GEDs may end up with different schedules creating an operational nightmare until the communication issue is resolved.

FIG. 1 illustrates example power system 100 that is utilizing voltage and VAR control. In the illustrated example, the power system 100 may include substation zone 102, regional zone 104, and local zone 106. Substation zone 102 may step down voltage using a transformer to the regional zone 104. Regional zone 104 may include a primary side of service transformers 112, 114, and 116. Service transformers 112, 114, and 116 may step down the voltage again, to be ready for consumer usage in local zone 106, on the secondary side of service transformers 112, 114, and 116. Local zone 106 may include GEDs 118, 120, and 122 servicing consumers 130, 132, and 134, respectively, with corresponding consumer loads that may be highly variable and stochastic. Without GEDs 118, 120, and 122, there is no voltage control in local zone 106.

Substation zone 102 may include LTCs that provide voltage control affecting regional zone 104 and local zone 106. Voltage, current, and power flows may be measured and fed to one or more supervisory control and data acquisition (SCADA) systems (not shown). Performance of the electric grid (e.g., losses, generation, demand, etc.) may be optimized according to a modeling and measurement-based optimization that drives the settings utilized for the LTCs, LVRs, and capacitor banks.

Regional zone 104 may include switched capacitor banks that provide VAR control. The control provided by the switched capacitor banks may be slow and "lumpy." For example, the switched capacitor banks may be switched two to three times a day. Further, the response time of a capacitor bank can be on the order of several seconds to minutes. Moreover, they cannot compensate for the voltage drop across distribution transformers that result in significant amounts of volatility at the grid edge. Moreover, problems can occur with long rural circuits with voltages that can tend to fall well below the minimum voltage limits, circuits with large amounts of solar power injected therein which can cause voltages to rise and fall with the overhead passage of the sun and/or clouds. The regional zone 104 may contain line voltage regulators (LVR) for voltage control. LVRs suffer from similar problems of slow response and limited number of switchings per day.

It should be understood that the range of control for voltage and VAR control in a power system, such as power system 100, using existing centralized methods may be limited. For example, and with regard to the substation zone 102, regulating the setting of an LTC can allow control of the feeder voltage to be achieved with a control range of approximately plus or minus eight percent. Approximately a one percent drop in voltage, for example, may reduce power by about one percent and capacitor bank VARs by about two percent. Accordingly, in regional zone 104, a capacitor bank can inject VARs resulting in an increase in voltage on the primary side of the feeder. The voltage (about 240 Volt base) may be increased by about one to about two volts for a typical feeder of about 300 kVARs. In the local zone 106, both LTCs and switched capacitor banks can regulate voltage for all connected loads (e.g., consumers 130, 132, and 134) simultaneously. Nevertheless, the LTCs and the switched capacitor banks cannot manage different actions needed at different load points. As such, complex optimization cannot be realized using existing techniques.

Accordingly, various embodiments are directed to systems and methods to autonomously regulate GEDs. In embodiments, the method may include obtaining one or more dynamically changing grid parameters. Additional parameters may be generated based on the one or more grid parameters. The one or more grid parameters may be applied to an equation that adjusts a setpoint in response to the one or more dynamically changing grid parameters. The GEDs, as illustrated in FIG. 1, may be deployed to an existing power system and may be configured to work with existing LTCs, LVRs, and/or capacitor bank infrastructure, which may provide voltage and VAR optimization. That is, voltage and VAR control may be delivered using GEDs, such as, but not limited to, edge of network grid optimization (ENGO) devices, smart inverters, smart meters, electric vehicle chargers, and other VAR sources. Examples of GEDs and/or VAR sources are described in U.S. patent application Ser. No. 14/659,418 entitled "Systems and Methods for Edge of Network Voltage Control of a Power Grid," which is incorporated herein by reference in its entirety.

By expanding the ubiquity of such devices that deliver voltage control, all levels/aspects of a power system can be regulated. That is, utilizing one or more GEDs can effectuate control at the consumer level (e.g., local zone 106). An aggregate of consumer level control can result in effectuating control at the feeder level (e.g., regional zone 104). Upon gaining control of an aggregate of feeders (e.g., substation zone 102), an entire power system or wide area electric grid network can be regulated. It should be noted that as utilized herein, the term GED can refer to any remotely controlled electronic device capable of directing VARs or directly controlling voltage (for example series-connected devices like a unified power flow controller (UPFC)) into an electric grid entry point. Again, examples may include, but are not limited to, a dedicated VAR source, such as an ENGO, a static synchronous compensator (STATCOM), an inverter or smart (e.g., solar) inverter that can deliver VARs, a VAR-enhanced smart meter, an electric vehicle charger, an ENGO device, a smart home automation device, etc.

In particular, decoupled volt and VAR control at the feeder level may be provided. Various embodiments may also provide dynamic lead-lag VAR support for the sub-transmission network. An unprecedented control of feeder voltage profile may be provided. Grid optimization, such as line loss reduction and peak demand reduction, may be realized. Grid integration, such as distributed PV, load/source dynamics mitigation, may also be realized. Grid support, such as weak node voltage support and reduced momentary impact, may be provided. Further still, various embodiments may provide automatic power factor control at the node and/or feeder level. It should be noted that feeder health may be ensured for various embodiments' visibility to feeder level secondary voltages. Still other embodiments may integrate decentralized control with centralized command. Additionally, it should be appreciated that power systems utilizing voltage and VAR control in accordance with various embodiments may be less susceptible to and/or resilient with respect to unit/device failure.

Figure 2:
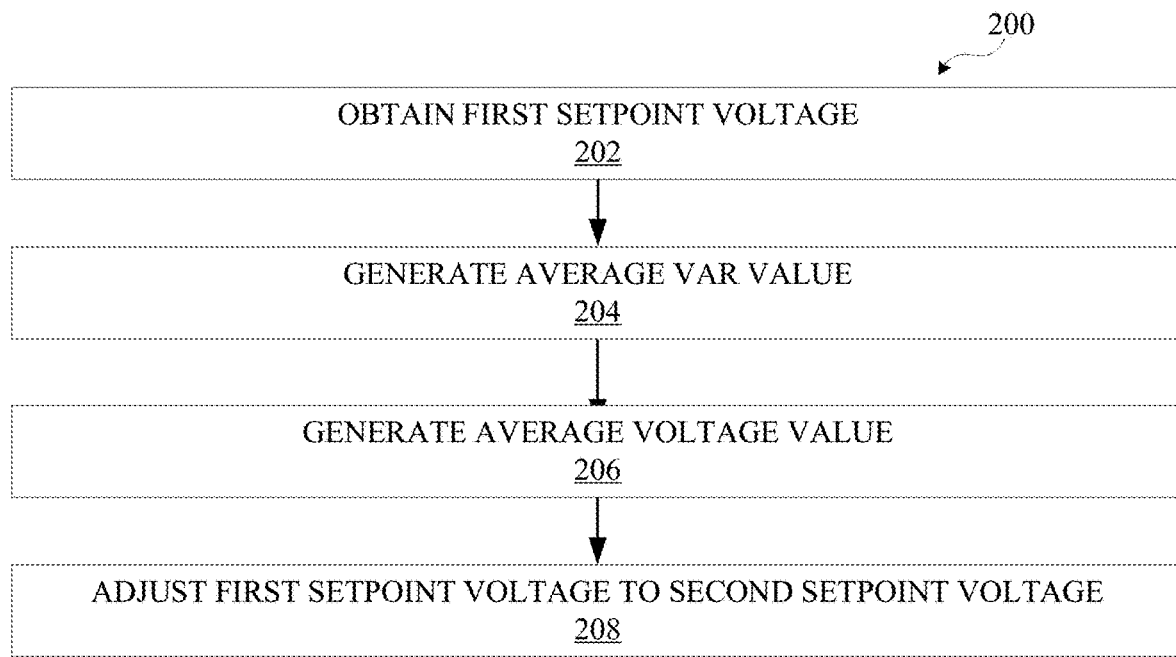
FIG. 2 is an operational flow diagram illustrating an example process for autonomously regulating GEDs, in accordance with various embodiments of the present disclosure.

FIG. 2 is an operational flow diagram illustrating an example process for autonomously regulating GEDs, in accordance with various embodiments of the present disclosure. The operations of the various methods described herein are not limited to the order described or shown in the figures, and it should be appreciated, upon studying the present disclosure, that variations of the order of the operations described herein are within the spirit and scope of the disclosure.

The operations and sub-operations of the flow diagrams described herein may be carried out, in some cases, by one or more of the components, elements, devices, components, and circuitry of the presently disclosed system. This may include one or more GEDs and computing component 3400, described herein and referenced with respect to at least FIG.

34, as well as subcomponents, elements, devices, components, and circuitry depicted therein and/or described with respect thereto. In such instances, the descriptions of the flow diagrams may refer to a corresponding component, element, etc., but regardless of whether an explicit reference is made, it will be appreciated, upon studying the present disclosure, when the corresponding component, element, etc. may be used. Further, it will be appreciated that such references do not limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagrams without departing from the scope of the present disclosure.

At 202, a first setpoint voltage may be obtained. The first setpoint voltage may be used for one or more GEDs. The one or more GEDs may be implemented on a secondary side of a distribution line providing electricity for a consumer. In some embodiments, the one or more GEDs may be able to sense distribution line voltage, among other grid parameters. The one or more GEDs may include one or more sensors (e.g., clock, temperature sensor, VAR sensor, voltage sensor, current sensor etc. capable of sensing voltage, current, VARs, time of day, number of switching operations, etc.

As an example, sensing VARs may be useful because a continuous state of saturation (over-injection or under-injection) of VARs could be a trigger to adjust the first setpoint voltage. As another example, differences between the first setpoint voltage and the average voltage value may indicate how well the presently disclosed technology is working. In one example, the time of day may help in estimating loading levels on the power system and can be used to set thresholds, or bounds, on the setpoint voltages. The time of day can also be useful to address PV related issues given that solar PV related issues can only occur during the daytime.

At 204, an average VAR value may be generated. The average VAR value may be generated by receiving VAR values on the distribution line over a time interval and averaging the received VAR values over the time interval. The time interval may be 1 minute, 5 minutes, 10 minutes, 15 minutes, 30 minutes, 1 hour, or other time intervals.

At 206, an average voltage value may be generated. The average voltage value may be generated by receiving voltage values on the distribution line over a time interval and averaging the received voltage values over the time interval.

At 208, the first setpoint voltage may be adjusted to a second setpoint voltage. The first setpoint voltage may be adjusted based on a difference between the average voltage value and the first setpoint voltage exceeding a voltage threshold value. An absolute value of the difference between the average voltage value and the first setpoint voltage may be used to determine whether the difference exceeds the voltage threshold value. In embodiments, the voltage threshold value may be between 0 and about 5 volts. In some embodiments, the voltage threshold value may be between about 0.5 to about 1 volts.

In embodiments, a first equation may be used when the average VAR value is less than a minimum VAR threshold value. The minimum VAR threshold value may be an upper bound on the minimum amount of VARs that may be flowing through the one or more GEDs. The first equation may be defined by $$\frac{dV_{sp}}{dt} = -M_v(V_{sp} - V_{wavg})$$

where $$\frac{dV_{sp}}{dt}$$

may represent the rate of change of the first setpoint voltage as a function of time, $M_v$ may represent the speed of VAR response to the second setpoint voltage, $V_{sp}$ may represent the first setpoint voltage, and $V_{wavg}$ may represent the average voltage value. $M_v$ may be randomized between the one or more GEDs to prevent infighting between the one or more GEDs in a power system and even between time steps for the same GED to ensure complete decoupling of controls.

In some embodiments, a maximum setpoint voltage threshold value may be selected, or used. When the second setpoint voltage is greater than the maximum setpoint voltage threshold value, the first setpoint voltage may be adjusted to the maximum setpoint voltage threshold value.

In some embodiments, a minimum setpoint voltage threshold value may be selected, or used. When the second setpoint voltage is less than the minimum setpoint voltage threshold value, the first setpoint voltage may be adjusted to the minimum setpoint voltage threshold value.

In embodiments, a second equation may be used when the average VAR value is greater than a maximum VAR threshold value. The maximum VAR threshold value may be a lower bound on the maximum amount of VARs that may be flowing through the one or more GEDs. The second equation may be defined by $$\frac{dV_{sp}}{dt} = -M_v(V_{sp} - b_{min}V_{wavg})$$

where $$\frac{dV_{sp}}{dt}$$

may represent the rate of change of the first setpoint voltage as a function of time, $M_v$ may represent the speed of VAR response to the second setpoint voltage, $V_{sp}$ may represent the first setpoint voltage, $b_{min}$ may represent a bias term to improve reducing the average VAR value, and $V_{wavg}$ may represent the average voltage value. In some embodiments, the second equation may be used when the first setpoint voltage is much lower than the average voltage value (e.g., about 4-6 V on about a 120 V base or about 3%). It should be appreciated that other values may be used to trigger the second equation.

As described above, the first setpoint voltage may be adjusted to a maximum setpoint voltage threshold value when the second setpoint voltage is greater than the maximum setpoint voltage threshold value or may be adjusted to a minimum setpoint voltage threshold value when the second setpoint voltage is less than the minimum setpoint voltage threshold value.

In embodiments, when the difference between the average voltage value and the first setpoint voltage is below, or at, a voltage threshold value, the first setpoint voltage may stay the same voltage. In some embodiments, when the average VAR value is within the minimum VAR threshold value and the maximum VAR threshold value, the first setpoint voltage may stay the same voltage.

Figure 3:
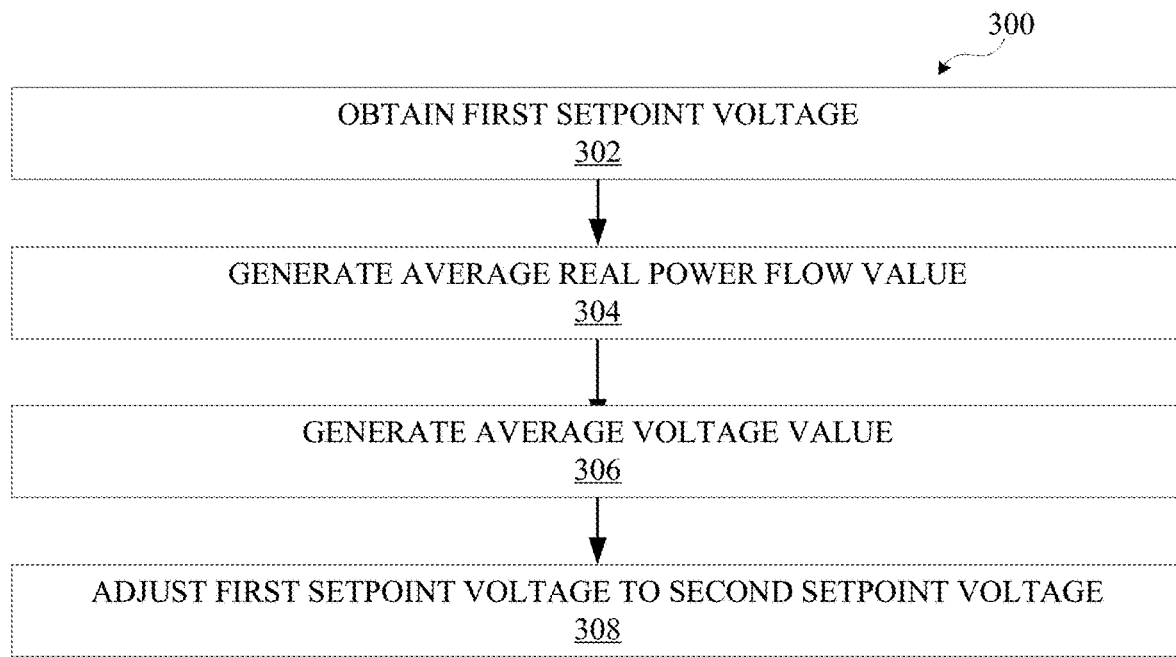
FIG. 3 is an operational flow diagram illustrating an example process for autonomously regulating GEDs, in accordance with various embodiments of the present disclosure.

FIG. 3 is an operational flow diagram illustrating an example process for autonomously regulating GEDs, in accordance with various embodiments of the present disclosure. At 302, a first setpoint voltage may be obtained, which may be substantially similar to the way described in FIG. 2 above.

At 304, an average real power flow value may be generated. The average real power flow value may be generated by receiving real power flow values on the distribution line over a time interval and averaging the received real power flow values over a time interval, similar to how the time interval is described in FIG. 2 above.

At 306, an average voltage value may be generated, which may be substantially similar to the way described in FIG. 2 above.

At 308, the first setpoint voltage may be adjusted to a second setpoint voltage, which may be substantially similar to the ways described in FIG. 2 above.

As an example of flowchart 300, the setpoint voltage of the GED can be changed as a function of real-power flow on the line, which may be useful during the day time (e.g., 9 am-3 pm). The setpoint voltage may increase when real power increases, and the setpoint voltage may decrease when the real power decreases. The equation used to update the setpoint may be $$V_{sp} = \begin{cases} V_{avg} + \dfrac{P}{kW_{avg}} K_{p+} & \text{if } P > 0 \\ V_{avg} + \dfrac{P}{kW_{avg}} K_{p-} & \text{if } P < 0 \end{cases}$$

where $V_{avg}$ may represent average voltage measured by the device over a certain time interval (e.g., 1 day, one week, two weeks, one month, etc.) without engaging control effort, $kW_{avg}$ may represent average real power flow measured at the transformer or at the point of measurement over a time interval, P may represent power flow at time t, and $K_{p+}$ and $K_{p-}$ may be represented by $$K_{p+} = \left(\dfrac{126 - V_{avg}}{1.25 \times kW_{max}}\right) kW_{avg}$$

$$K_{p-} = \left(\dfrac{V_{avg} - 114}{1.25 \times kW_{max}}\right) kW_{avg}$$

In some embodiments, the equation used to update the setpoint may be $$V_{sp} = \begin{cases} V_{avg} + P * K_{p+} & \text{if } P > P_{th} \\ V_{avg} + P * K_{p-} & \text{if } P < -P_{th} \\ V_{avg} & \text{otherwise} \end{cases}$$

where the grid parameters may be substantially similar to the above equation used to update the setpoint, except $P_{th}$ is a power flow threshold value.

To further illustrate flowchart 300, an example is provided. A GED may be connected to the transformer and may measure the average kW flow through the transformer and average voltage as about 2 kW and about 122V, respectively. The maximum kW flow measured during this interval is about 15 kW. No VAR injection or absorption or voltage control occurs during this interval via the GED.

In this example, at time t, the real power flow measured by the GED may be about 10 kW. The setpoint voltage of the GED may be computed using the above equation, such that $$V_{SP} = V_{avg} + \dfrac{P}{kW_{avg}} K_{p+}$$

$$K_{p+} = \left(\dfrac{126 - V_{avg}}{1.25 \times kW_{max}}\right) kW_{avg} = \left(\dfrac{126 - 122}{1.25 \times 15}\right) 2 = 0.427$$

$$V_{SP} = 122 + \dfrac{10kW}{2kW} 0.427 = 124.1 V$$

At time t+1, if the real power flow measured by the GED is about −5 kW. Then, the setpoint voltage of the GED may be computed using the following equation, described above:

$$V_{SP} = V_{avg} + \dfrac{P}{kW_{avg}} K_{p-}$$

$$K_{p-} = \left(\dfrac{V_{avg} - 114}{1.25 \times kW_{max}}\right) kW_{avg} = \left(\dfrac{122 - 114}{1.25 \times 15}\right) 2 = 0.853$$

$$V_{SP} = 122 - \dfrac{5kW}{2kW} 0.853 = 119.8 V$$

Figure 4:
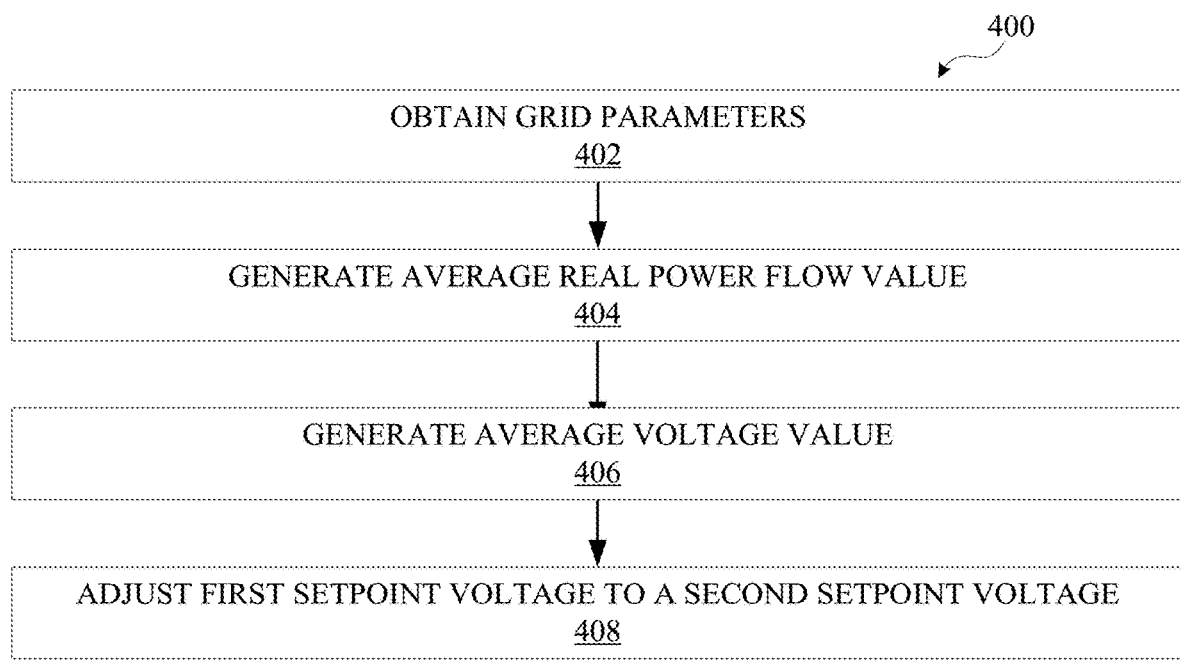
FIG. 4 is an operational flow diagram illustrating an example process for autonomously regulating GEDs, in accordance with various embodiments of the present disclosure.

FIG. 4 is an operational flow diagram illustrating an example process for autonomously regulating GEDs, in accordance with various embodiments of the present disclosure. At 402, one or more grid parameters may be obtained, substantially similar to the way described in FIG. 2 above. The one or more grid parameters may include a time interval, a first setpoint voltage, a minimum VAR threshold, a maximum VAR threshold, a bias term, a setpoint voltage threshold, a response speed of the GED, a maximum setpoint voltage threshold, a minimum setpoint voltage threshold, among others, such as current, time of day, number of switching operations, etc. A setpoint voltage threshold may be about 1.5% of the current setpoint voltage in a positive and negative direction (e.g., if the setpoint voltage threshold were about 125 V the setpoint voltage threshold may be about 123.13 on a lower bound and 126.88 on an upper bound. In some embodiments, the setpoint voltage threshold may be about 3 V from a current setpoint voltage.

At 404, an average real power flow value may be generated, substantially similar to the way described in FIG. 3 above.

At 406, an average voltage value may be generated, substantially similar to the way described in FIG. 2 above.

At 408, the first setpoint voltage may be adjusted to a second setpoint voltage, substantially similar to the ways described in FIG. 3 above.

Figure 5:
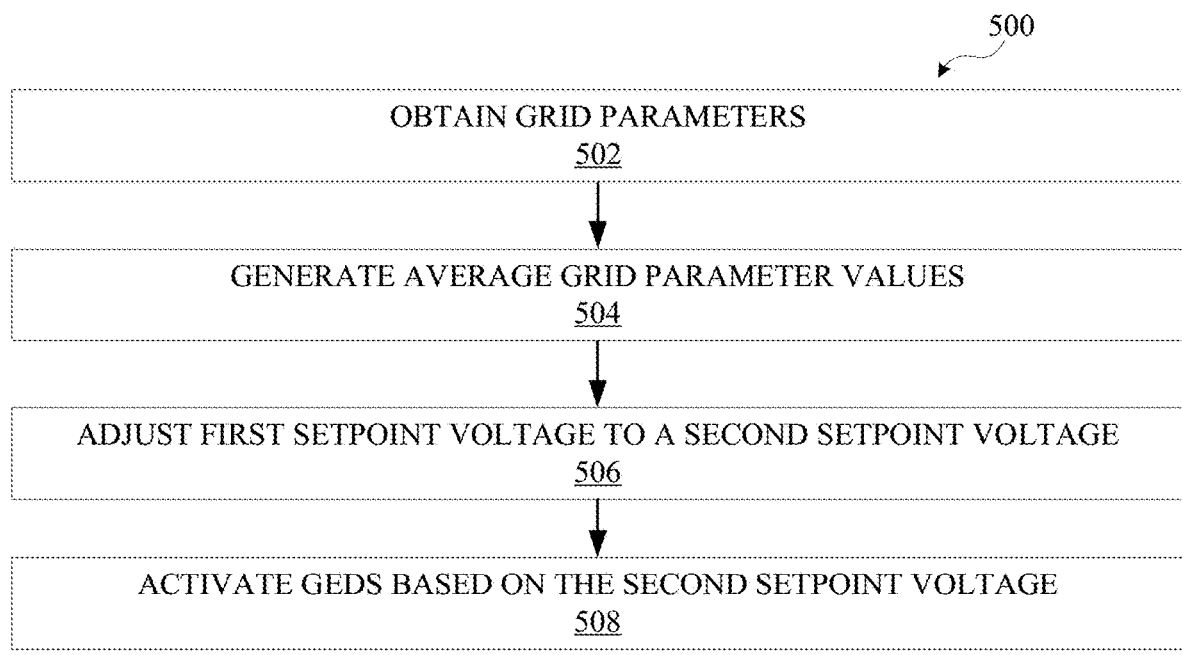
FIG. 5 is an operational flow diagram illustrating an example process for autonomously activating GEDs, in accordance with various embodiments of the present disclosure.

FIG. 5 is an operational flow diagram illustrating an example process for autonomously activating GEDs, in accordance with various embodiments of the present disclosure. At 502, one or more grid parameters may be obtained, as described above.

At 504, average grid parameters may be generated, as described above.

At 506, the first setpoint voltage may be adjusted to a second setpoint voltage, substantially similar to the ways described in FIG. 3 above.

At 508, a GED may be activated based on the second setpoint voltage. The GED may inject or absorb VARs to move toward the second setpoint voltage in accordance with the equations described herein.

Figure 6:
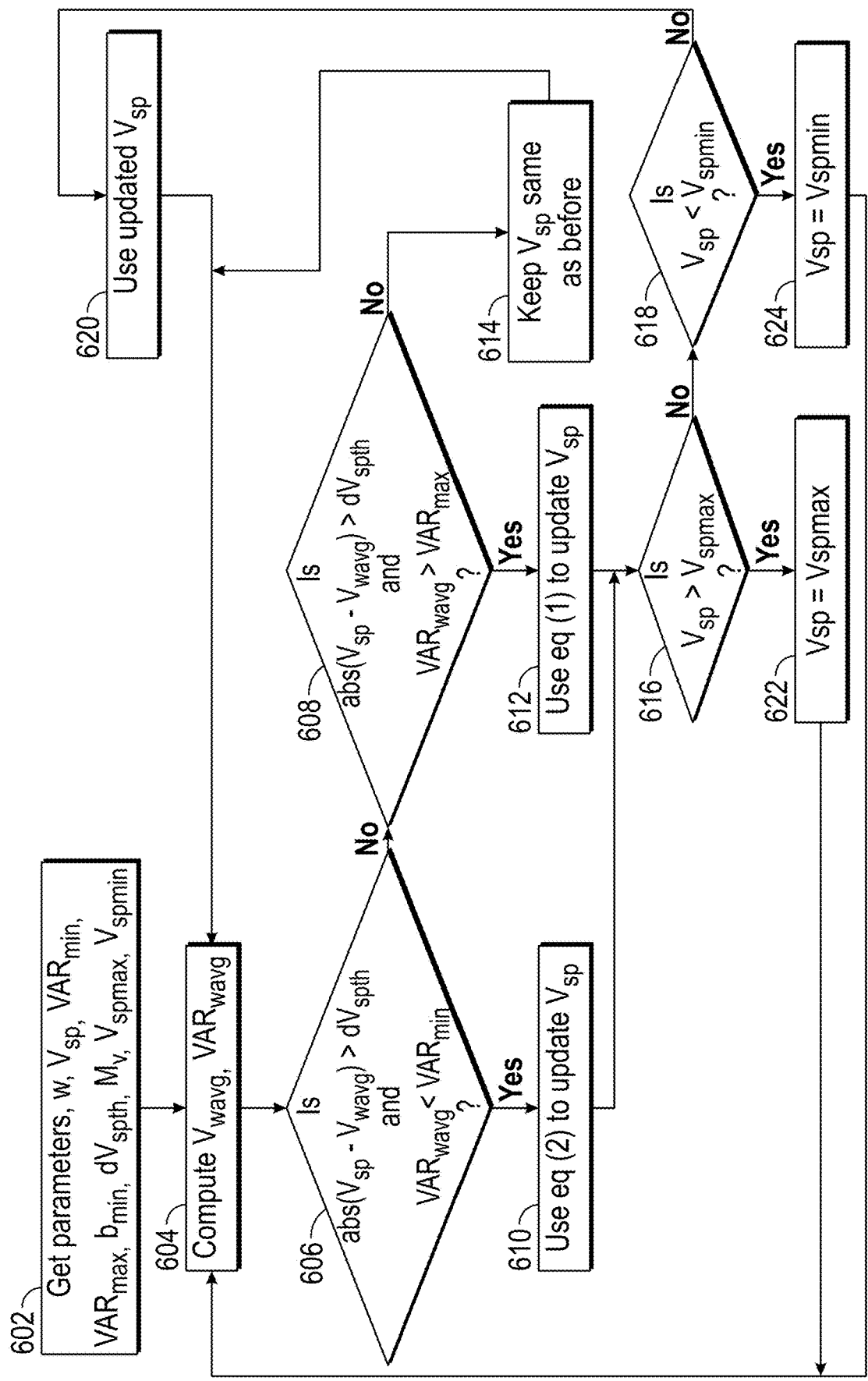
FIG. 6 is an operational flow diagram illustrating an example process for autonomously regulating GEDs, in accordance with various embodiments of the present disclosure.

FIG. 6 is an operational flow diagram illustrating an example process for autonomously activating GEDs, in accordance with various embodiments of the present disclosure. At 602, obtain, or get, one or more grid parameters.

At 604, one or more average parameter values may be computed. For example, this may include average voltage values, average VAR values, average real power flow values, average current values, etc.

At 606, it may be determined that the second equation applies. As illustrated, when the absolute value of the difference between the first setpoint voltage and the average voltage value is greater than a voltage threshold value and the VAR average value is less than the minimum VAR threshold value a second equation may apply. As described above, the second equation may be $$\frac{dV_{sp}}{dt} = -M_v(V_{sp} - b_{min}V_{wavg})$$

In some embodiments, using the first equation, $V_{sp}$ would increase exponentially with time and try to get closer to $V_{wavg}$ where the VAR injection will start increasing. The increase in $V_{sp}$ can slow down considerably before reaching the first setpoint voltage. A bias term can be multiplied to $V_{wavg}$, thereby forcing $V_{sp}$ to be greater than $V_{wavg}$ in steady state. In such situations, the second equation may be more appropriate. In embodiments, $b_{min}$ can be chosen between about 1 to about 1.01. However, for different systems and applications, it should be appreciated that different values may apply.

In some embodiments, the bias term can be applied to when the average VAR value is greater than $VAR_{max}$ or when $V_{sp}$ is much higher than $V_{wavg}$. In embodiments, $b_{max}$ may be used in lieu of $b_{min}$, and $b_{max}$ may be 1.

In some embodiments, the setpoint voltages set by the second equation may cause tiny changes in $V_{sp}$, resulting in a "noisy" profile. To limit the changes in $V_{sp}$, a difference between $V_{sp}$ and $V_{wavg}$ can be compared to a voltage threshold ($dV_{spth}$). Typical values of $dV_{spth}$ may be around 0.5 to around 1 volt.

In embodiments, a maximum setpoint voltage threshold and a minimum setpoint voltage threshold may be used to ensure $V_{sp}$ stays within selected bounds. In one embodiment, a maximum setpoint voltage threshold may be selected by observing the voltage during night time and adding a few volts of drop to it For the minimum setpoint voltage threshold, a similar process may be performed during the peak hours of the day. In some embodiments, the maximum setpoint voltage threshold and the minimum setpoint voltage threshold of about 126V and about 114V, respectively, may be used.

At 608, it may be determined that the first equation applies. As illustrated, when the absolute value of the difference between the first setpoint voltage and the average voltage value is greater than a threshold value and the VAR average value is greater than the maximum VAR threshold value, a first equation may apply. The first equation may be $$\frac{dV_{sp}}{dt} = -M_v(V_{sp} - V_{wavg})$$

as described above. The first equation may force the setpoint voltage to adjust in such a direction that causes the VAR usage to move away from extremes. The first equation may be iteratively applied until the VAR thresholds are not violated. The first equation may provide a smooth exponential change in $V_{sp}$ over time, which may provide stability in VARs.

At 610, the second equation may be applied to adjust the first setpoint voltage to a second setpoint voltage.

At 612, the first equation may be applied to adjust the first setpoint voltage to a second setpoint voltage.

At 614, the first setpoint voltage may be maintained.

At 616, the second setpoint voltage may be compared to a maximum voltage threshold value.

At 618, the second setpoint voltage may be compared to a minimum voltage threshold value.

At 620, the second setpoint voltage generated by the first equation or the second equation may be applied to the GED.

At 622, the maximum voltage threshold value may be applied to the GED.

At 624, the minimum voltage threshold value may be applied to the GED.

It should be appreciated that other implementations are possible, for instance, taking VAR injection as a part of the presently disclosed technology. It should be appreciated that this method can be applied to any GED.

In embodiments, dynamically setting the bandwidth may be useful because assets with an electro-mechanical switching element, such as a relay, may have a limit on the number of switching operations for the life of the asset. A tighter bandwidth can lead to excessive number of switching operations while a relaxed bandwidth may provide degraded performance. Selecting the appropriate bandwidth may help optimize the settings for the asset. Depending on upstream impedance (e.g., service transformer and/or the distribution line), the voltage increases per kVAR injected may be different on different feeders and manual setting cannot be relied upon.

In embodiments, the presently disclosed technology can dynamically set a bandwidth of a GED. For example, a default bandwidth may be selected (e.g., +/−1 volt). Daily switching operations may be monitored. Average daily switching operations may be computed over a time interval (e.g., 1 day, 5 days, 2 weeks, 4 weeks, 2 months, 6 months, etc.). If the number of switching operations is higher than the average switching operations needed to achieve a certain life of the asset, the bandwidth may be relaxed (e.g., by about 0.125 volts). Otherwise, the bandwidth may be tightened (e.g., by about 0.125V). This may be updated based on the time interval. In some embodiments, the bandwidth setting may be stopped when the bandwidth is within a certain threshold of ideal switching operations. For example, an example relay life cycle may be about 300,000 operations and an example life cycle of a GED may be about fifteen years. Each year may have about 20,000 operation per relay. Each month may have about 667 operations per year. For an example GED, where there may be ten relays, there may be about 6,600 operations per month as the ideal switching operations. It should be appreciated that this may be different for different types of GEDs.

In embodiments, the presently disclosed technology may be used to manage solar PVs during periods of high insolation. The one or more GEDs may track daytime voltage history. The one or more GEDs may sense and store hourly average voltages during high insolation hours (e.g., around 9 am to around 3 pm). The presently disclosed technology may identify high insolation activity. For example, if the average hourly voltages increase continuously, the presently disclosed technology may attribute the continuous increase to the PVs. For example, if the average voltage from about 9 am to about 10 am is about 123 volts, the average voltage from about 10 am to about 11 am is about 123.5 volts, and subsequent voltage is about 124.2 volts, then high solar insolation activity may be detected.

During high solar insolation activity, the setpoint voltage may not move until an average voltage returns to the value at which it started increasing. For example, using the previous example, this value may be about 123 volts. This may prevent the GED from injecting excessive VARs by changing its setpoint dynamically and may pull voltage down by reducing VAR injection.

The presently disclosed technology resolves infighting concerns due to the autonomous nature of the one or more GEDs. The average VAR injection of multiple GEDs connected at the same location is unlikely to be the same because the presently disclosed technology may apply when VAR limits are violated. The probability of two GEDs adjusting the setpoint voltages to create system instability is low. Moreover, the speed of response, $M_v$, can be randomized within each iteration to ensure that speeds of setpoint change in different GEDs are different.

Figure 7:
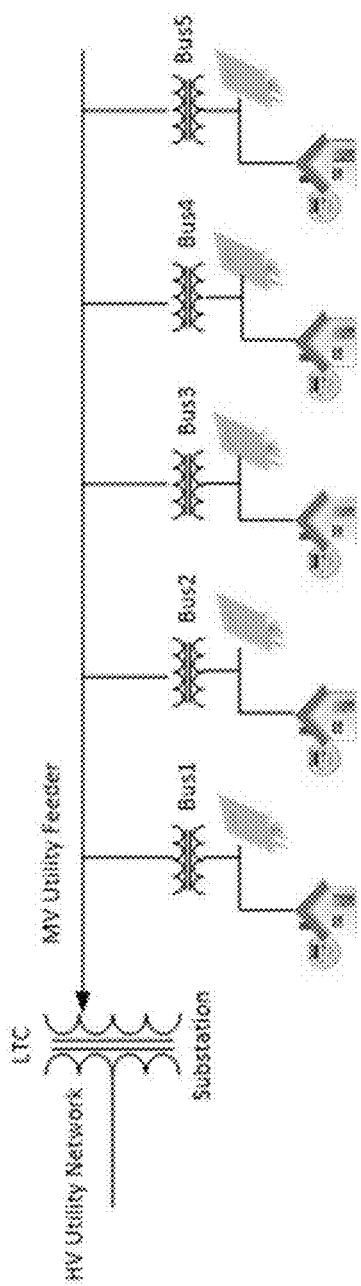
FIG. 7 is a diagram of an example power system with multiple GEDs, in accordance with various embodiments of the present disclosure.

FIG. 7 is a diagram of an example power system with multiple GEDs, in accordance with various embodiments of the present disclosure. The example power system was used to simulate different testing conditions.

Figure 8:
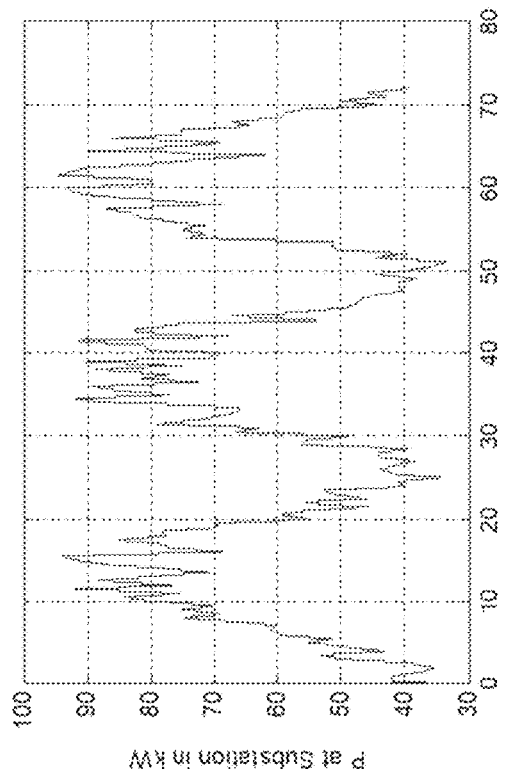
FIG. 8 is a graph illustrating power at a substation over a time interval, in accordance with various embodiments of the present disclosure.

FIG. 8 is a graph illustrating power at a substation over a time interval, in accordance with various embodiments of the present disclosure. The power, measured in kW, oscillates over about 80 hours in about 12 hour time intervals between a high and low amplitude of about 90 kW to about 40 kW, respectively.

Figure 9:
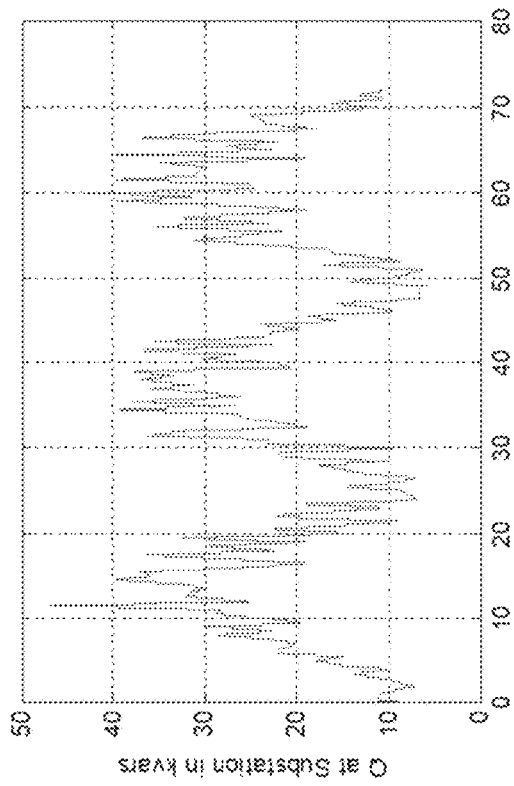
FIG. 9 is a graph illustrating VARs at a substation over a time interval, in accordance with various embodiments of the present disclosure.

FIG. 9 is a graph illustrating VARs at a substation over a time interval, in accordance with various embodiments of the present disclosure. The charge, measured in kVARs, oscillates in a substantially similar fashion as the graph of FIG. 8. The high is around 40 kVARs and the low is around 10 kVARs.

Figure 10:
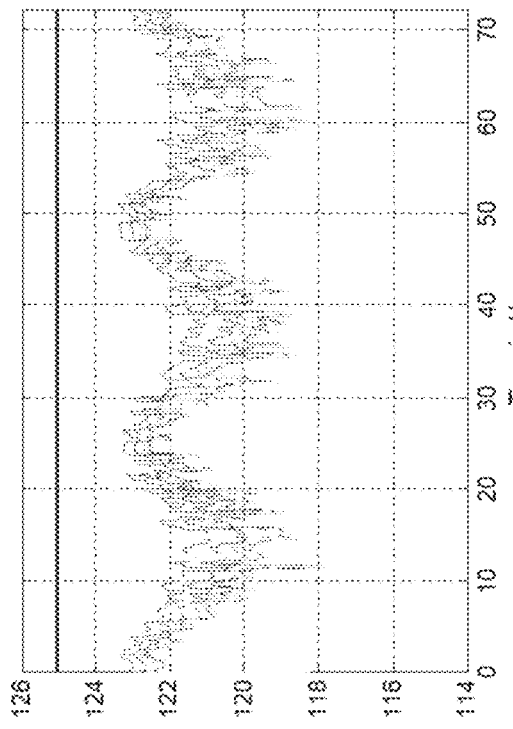
FIG. 10 is a graph illustrating voltage on secondary of service transformers of multiple buses over a time interval, in accordance with various embodiments of the present disclosure.

FIG. 10 is a graph illustrating voltage on secondary side of service transformers of multiple buses over a time interval, in accordance with various embodiments of the present disclosure. As illustrated, the graph illustrates voltage profiles of the five buses in FIG. 7. They each oscillate between low and high amplitudes of about 119 volts to about 123 volts, respectively, by about 12 hour time intervals. The line above the voltage profiles may represent the LTC setpoint at about 125 volts.

Figure 11:
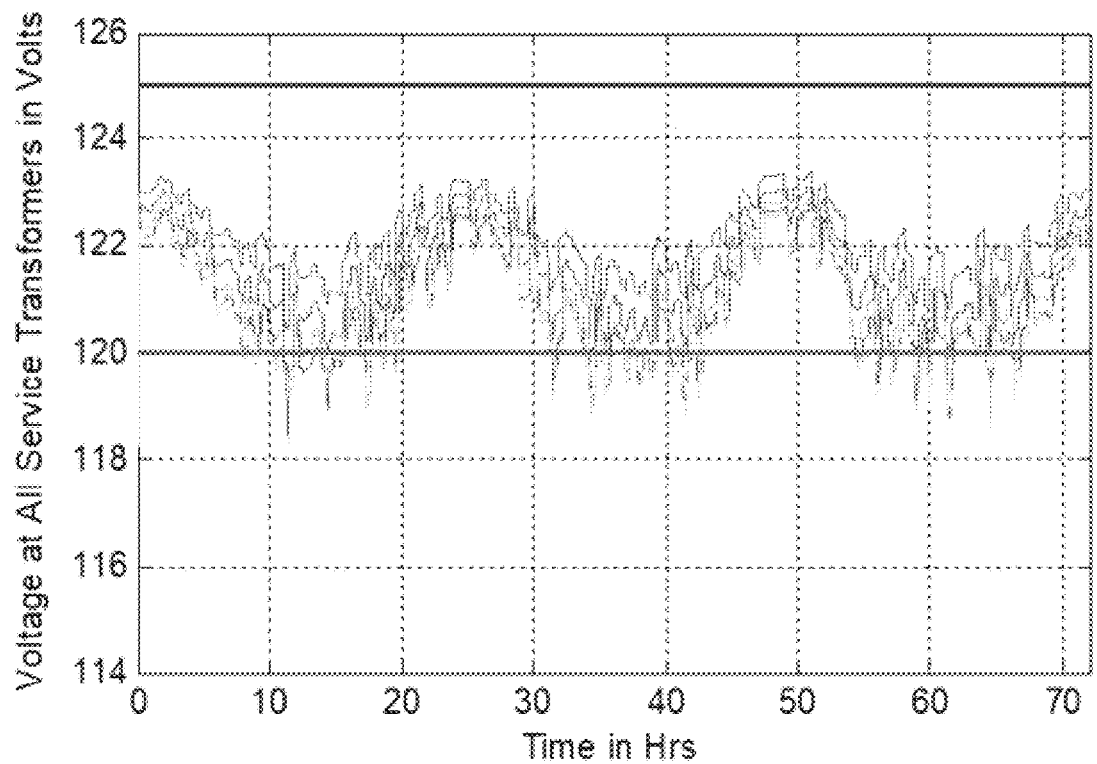
FIG. 11 is a graph illustrating a voltage profile at multiple nodes in an example system.
Figure 12:
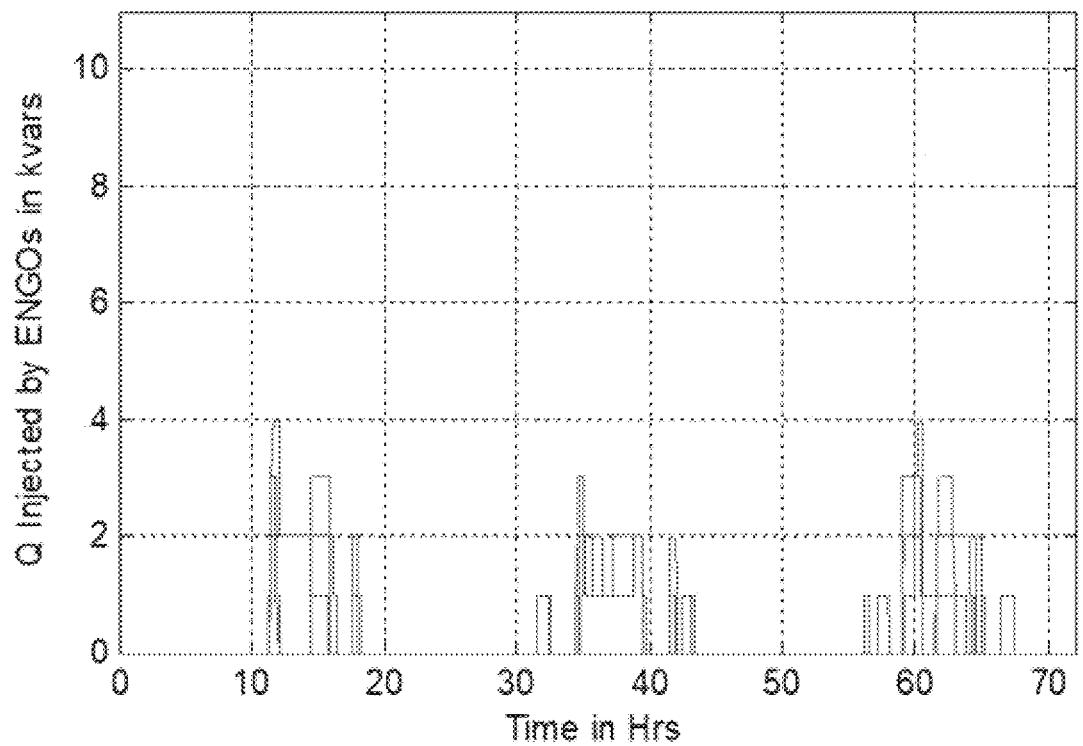
FIG. 12 is a graph illustrating VARs injected by GEDs in an example system.

FIGS. 11 and 12 may be based on a first test case, where the setpoints of all GEDs are different from the LTC setpoint. As illustrated, the LTC setpoint is at about 125 volts, about 4% higher than GED setpoint of about 120 volts. In the first test case, the presently disclosed technology is not applied to simulate the condition on the grid with a setpoint mismatch. FIG. 11 is a graph illustrating a voltage profile at multiple nodes in an example system. The lower line represents the GED setpoint and the upper line represents the LTC setpoint. Without the presently disclosed technology, the voltage follows the load variation and is not at all regulated. VAR injection happens when load increases on the system for a few hours.

FIG. 12 is a graph illustrating VARs injected by GEDs in an example system. VARs may be injected with the low points of the voltage profile of FIG. 11.

Figure 13:
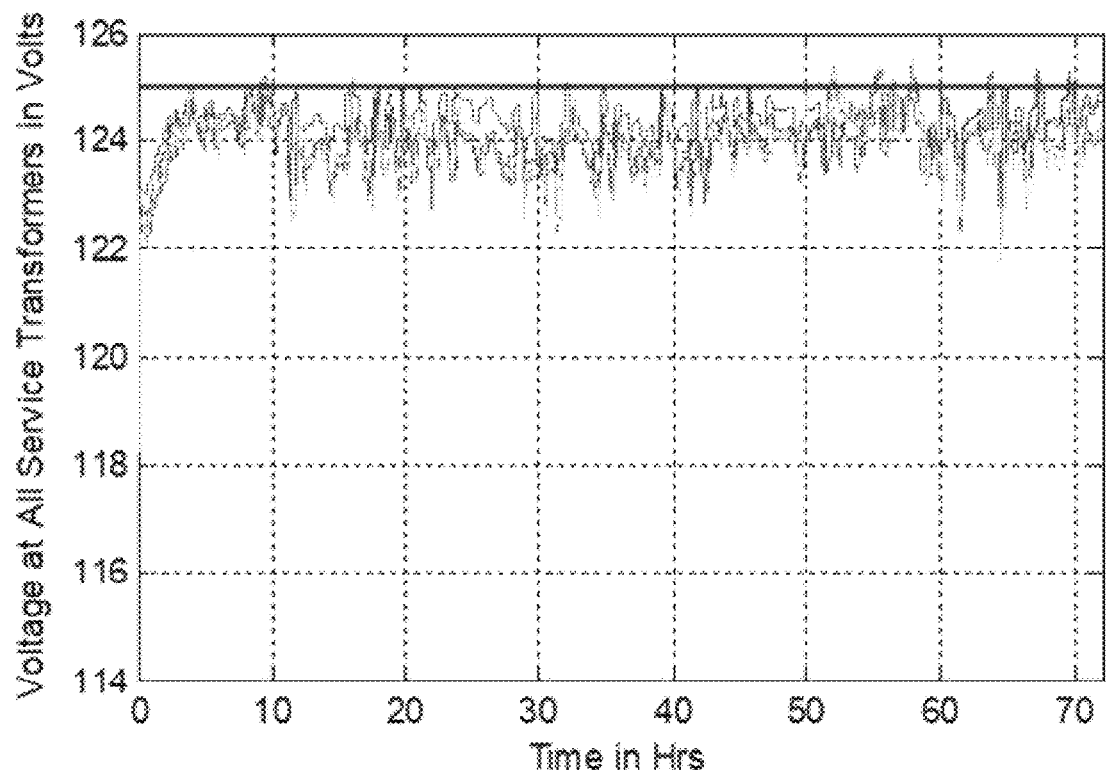
FIG. 13 is a graph illustrating a voltage profile at multiple buses in an example system, in accordance with various embodiments of the present disclosure.

FIGS. 13, 14, 15, and 16 may be based on a second test case that is substantially similar to the first test case, except the presently disclosed technology is applied. FIG. 13 is a graph illustrating a voltage profile at multiple buses in an example system, in accordance with various embodiments of the present disclosure. The voltage profile at all five nodes is illustrated. The upper line represents the LTC setpoint. As illustrated, the voltage is well regulated close to the LTC setpoint of about 125 volts.

Figure 14:
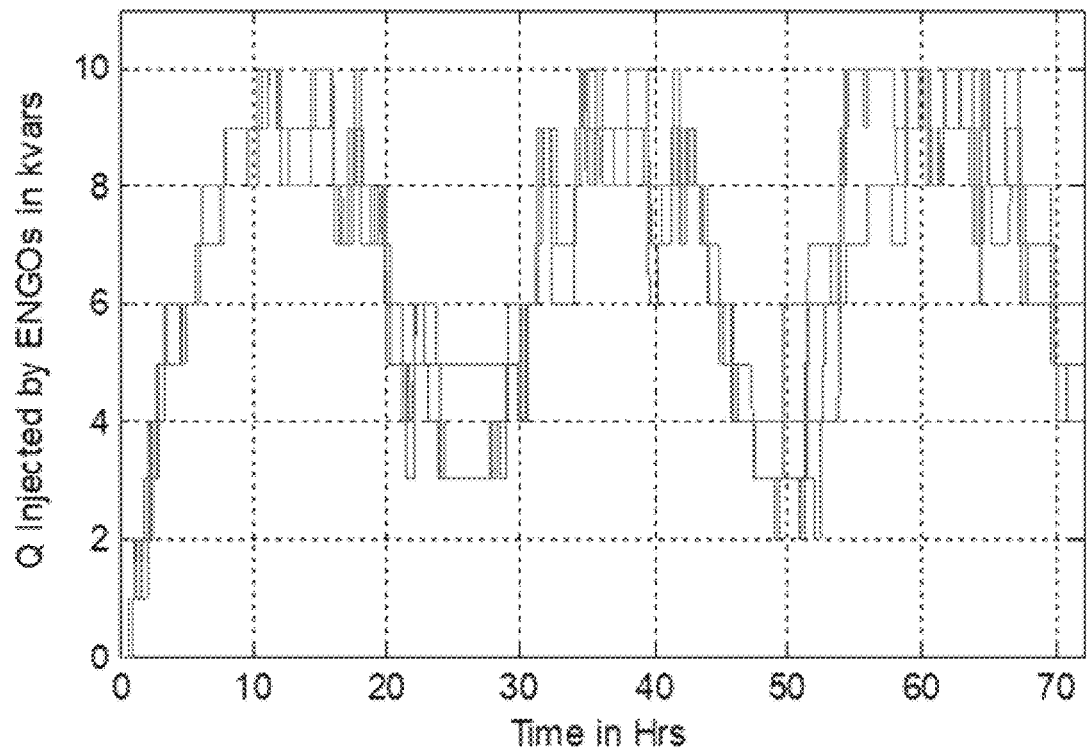
FIG. 14 is a graph illustrating a VAR profile of multiple GEDs in an example system, in accordance with various embodiments of the present disclosure.

FIG. 14 is a graph illustrating a VAR profile of multiple GEDs in an example system, in accordance with various embodiments of the present disclosure. The VAR profile of all five nodes is illustrated. The VAR injection profile changes with load as expected. The VAR injection profile changes with load as expected.

Figure 15:
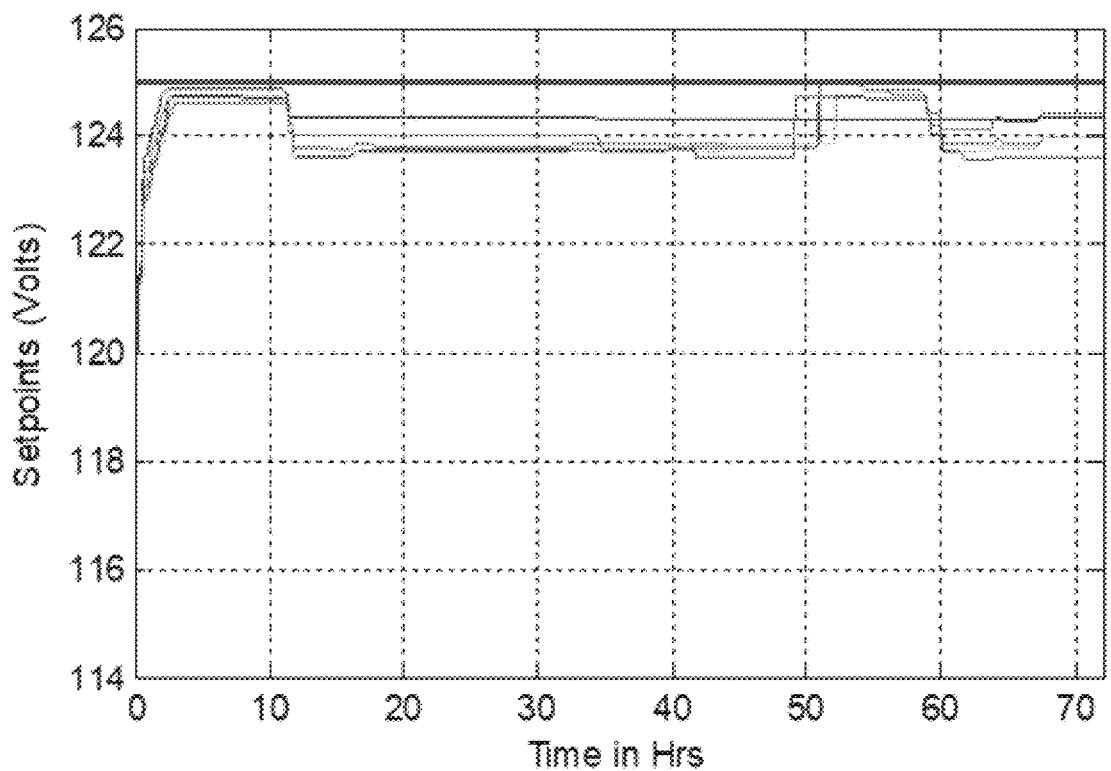
FIG. 15 is a graph illustrating setpoint dynamics of multiple GEDs in an example system, in accordance with various embodiments of the present disclosure.

FIG. 15 is a graph illustrating setpoint dynamics of multiple GEDs in an example system, in accordance with various embodiments of the present disclosure. The setpoint of individual GEDs and their variation is illustrated. All the GEDs achieve a setpoint close to the LTC very quickly and are able to maintain a setpoint close to the LTC setpoint of about 125V during the simulation. Nominal variations in individual setpoints is illustrated over the second test case with minimal functional impact on overall system performance.

Figure 16:
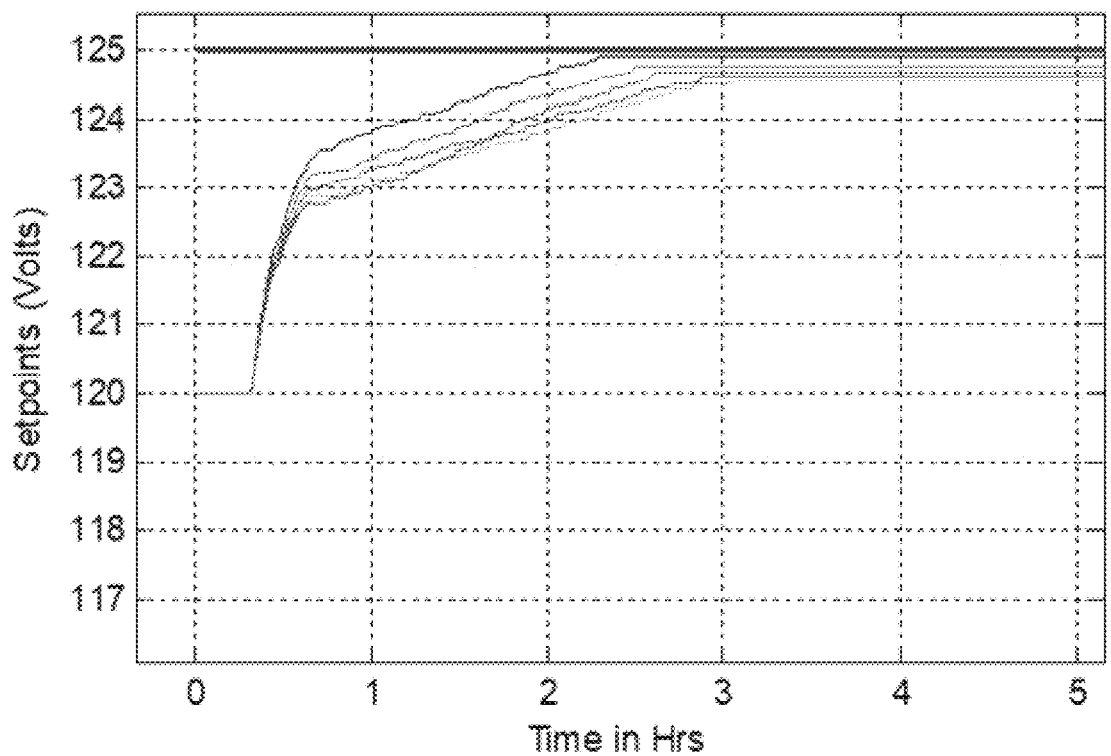
FIG. 16 is a graph illustrating setpoint dynamics of multiple GEDs in an example system, in accordance with various embodiments of the present disclosure.

FIG. 16 is a graph illustrating setpoint dynamics of multiple GEDs in an example system, in accordance with various embodiments of the present disclosure. A zoomed in view of the individual setpoints of FIG. 15 is illustrated. As illustrated, the setpoints quickly move towards the LTC setpoint of about 125 volts initially, and then the setpoints slow down. The setpoints all go on separate trajectories, thereby avoiding any chances of infighting.

Figure 17:
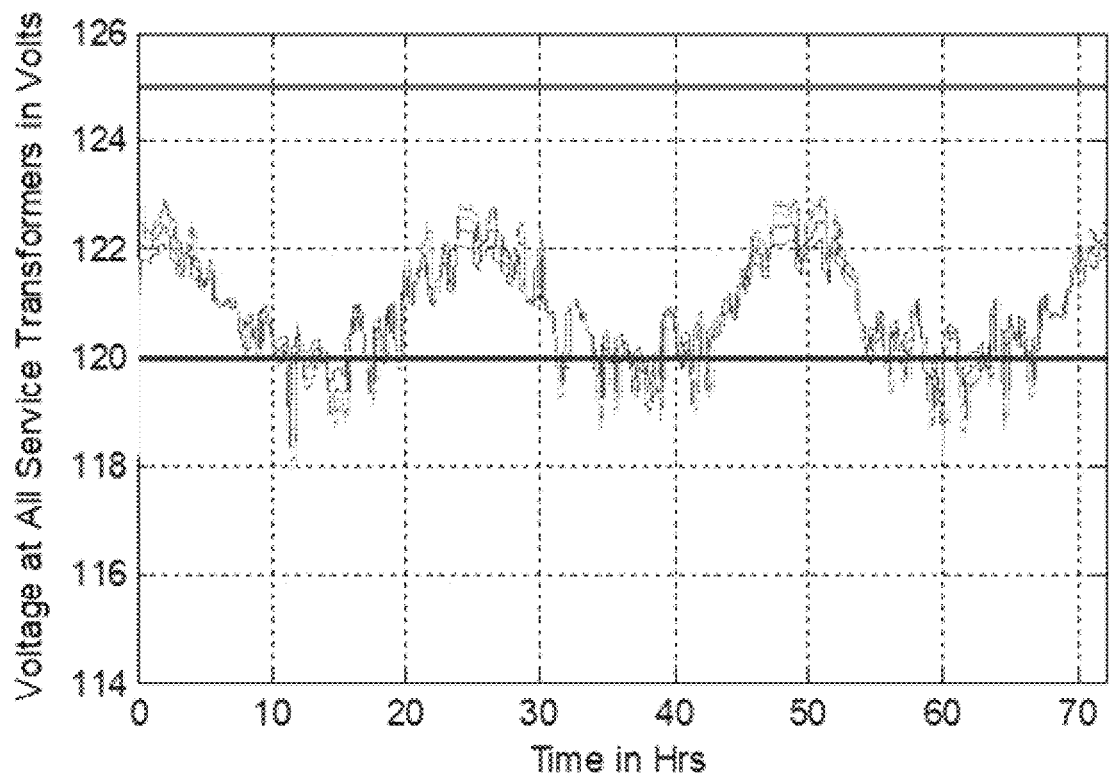
FIG. 17 is a graph illustrating a voltage profile of multiple nodes in an example system.
Figure 18:
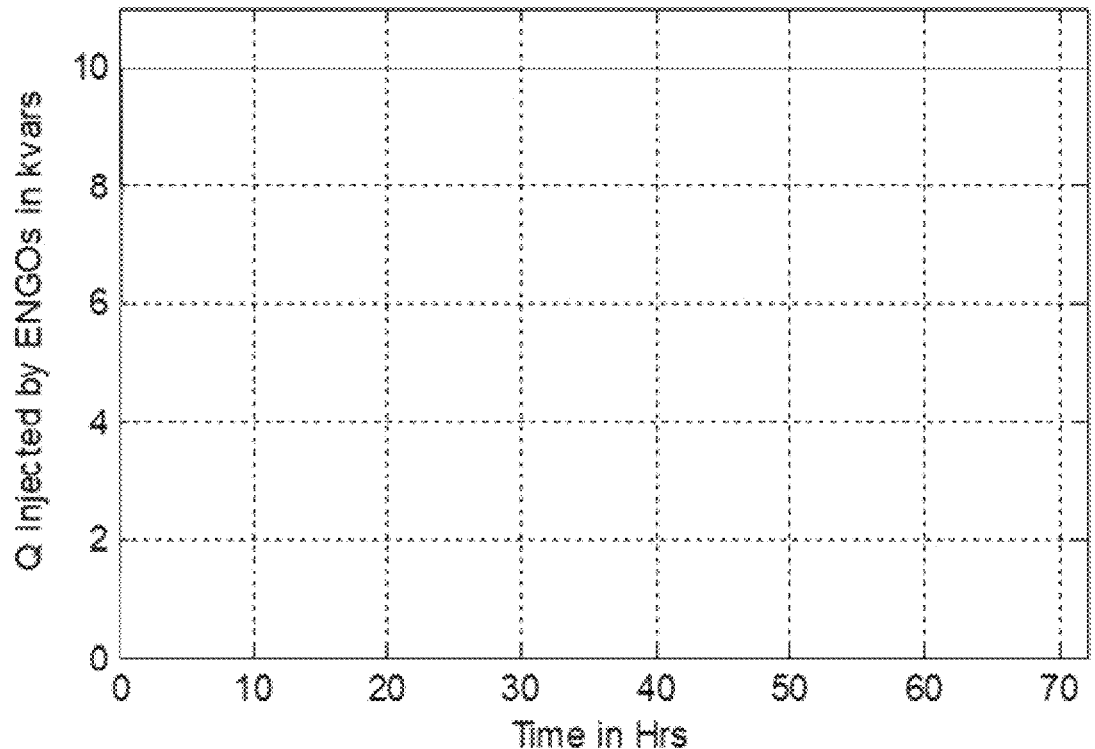
FIG. 18 is a graph illustrating over-injection at multiple grid-edge devices.

FIGS. 17 and 18 may be based on a third test case, when the GED setpoint is set higher than the LTC setpoint, causing over-injection without the presently disclosed technology applied. FIG. 17 is a graph illustrating a voltage profile of multiple nodes in an example system. The upper line may be a GED setpoint at about 125 volts and the lower line may be a LTC setpoint set at about 120 volts. Without the presently disclosed technology, the voltage is not well regulated.

FIG. 18 is a graph illustrating over-injection at multiple grid-edge devices. All GEDs are fully saturated injecting all 10 kVARs throughout, acting as fixed banks.

Figure 19:
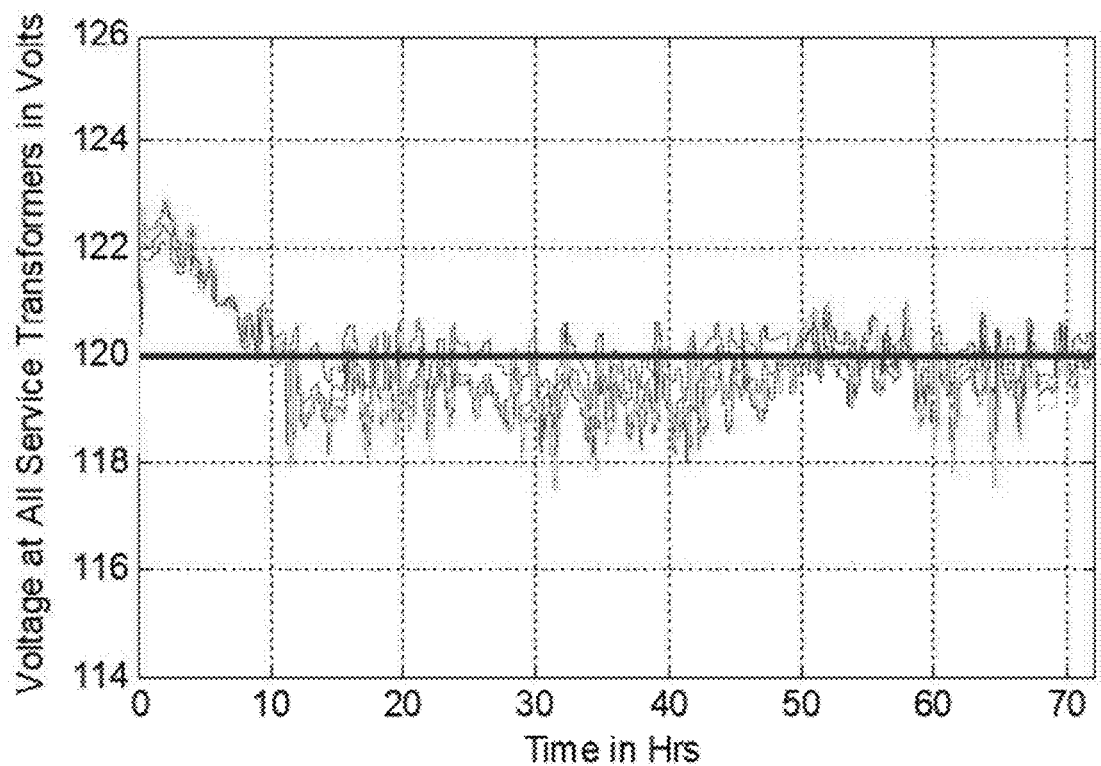
FIG. 19 is a graph illustrating a voltage profile of multiple nodes in an example system, in accordance with various embodiments of the present disclosure.

FIGS. 19, 20, 21, and 22 may be based on a fourth test case, which is substantially similar to the third test case, but with the presently disclosed technology applied. FIG. 19 is a graph illustrating a voltage profile of multiple nodes in an example system, in accordance with various embodiments of the present disclosure. As illustrated, the voltage profile at all five nodes tracks the LTC setpoint over time.

Figure 20:
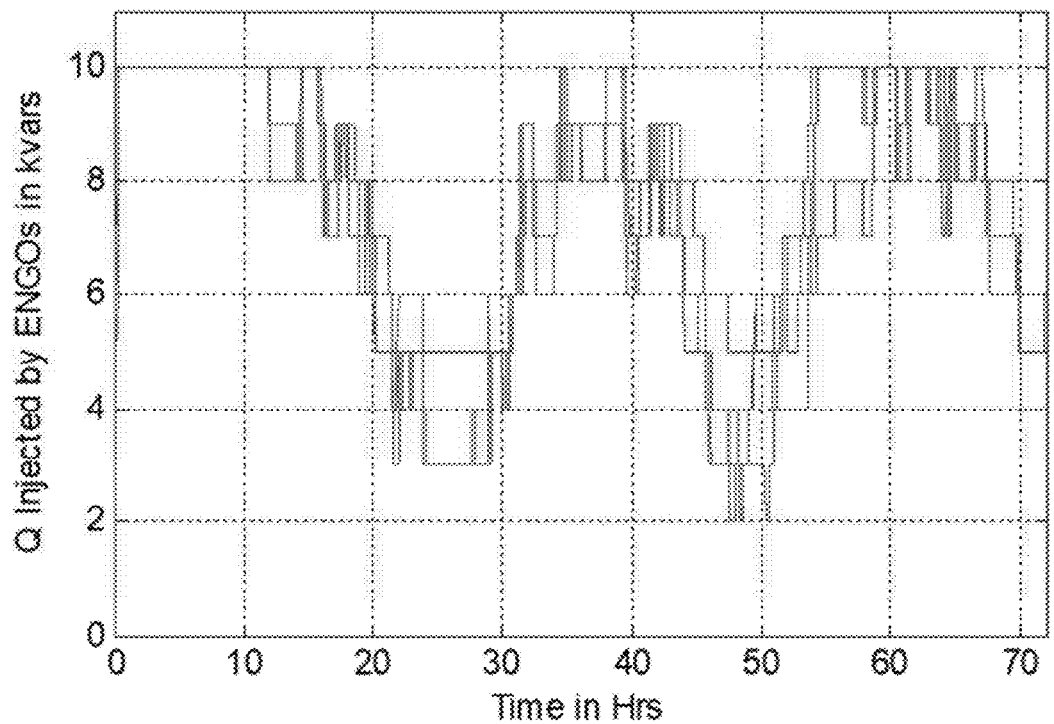
FIG. 20 is a graph illustrating VAR injection of multiple grid-edge devices, in accordance with various embodiments of the present disclosure.

FIG. 20 is a graph illustrating VAR injection of multiple grid-edge devices, in accordance with various embodiments of the present disclosure. The VAR profile of GEDs illustrates a good VAR utilization of all devices.

Figure 21:
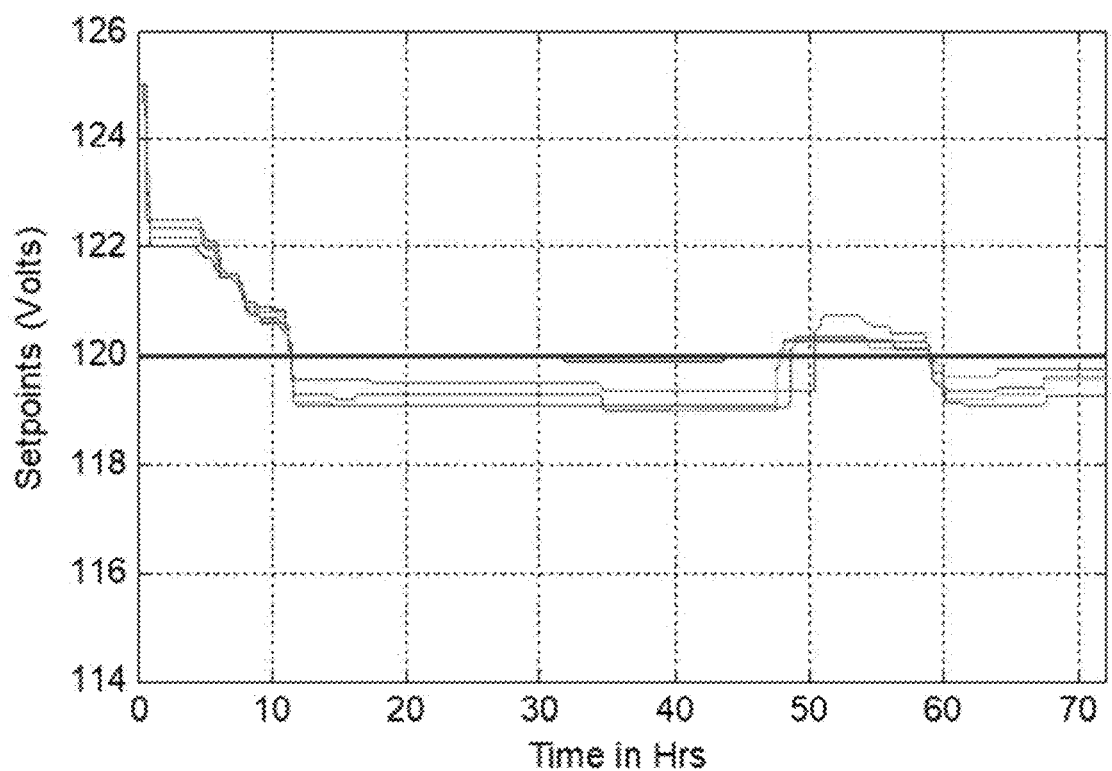
FIG. 21 is a graph illustrating setpoints of multiple GEDs converging to an example setpoint, in accordance with various embodiments of the present disclosure.

FIG. 21 is a graph illustrating setpoints of multiple GEDs converging to an example setpoint, in accordance with various embodiments of the present disclosure. The setpoint of individual GEDs and their variation is illustrated. All the GEDs achieve a setpoint close to the LTC very quickly and are able to maintain a setpoint close to the LTC setpoint of about 120 volts during the simulation. Nominal variations in individual setpoints are illustrated over the fourth test case with minimal functional impact on overall system performance.

Figure 22:
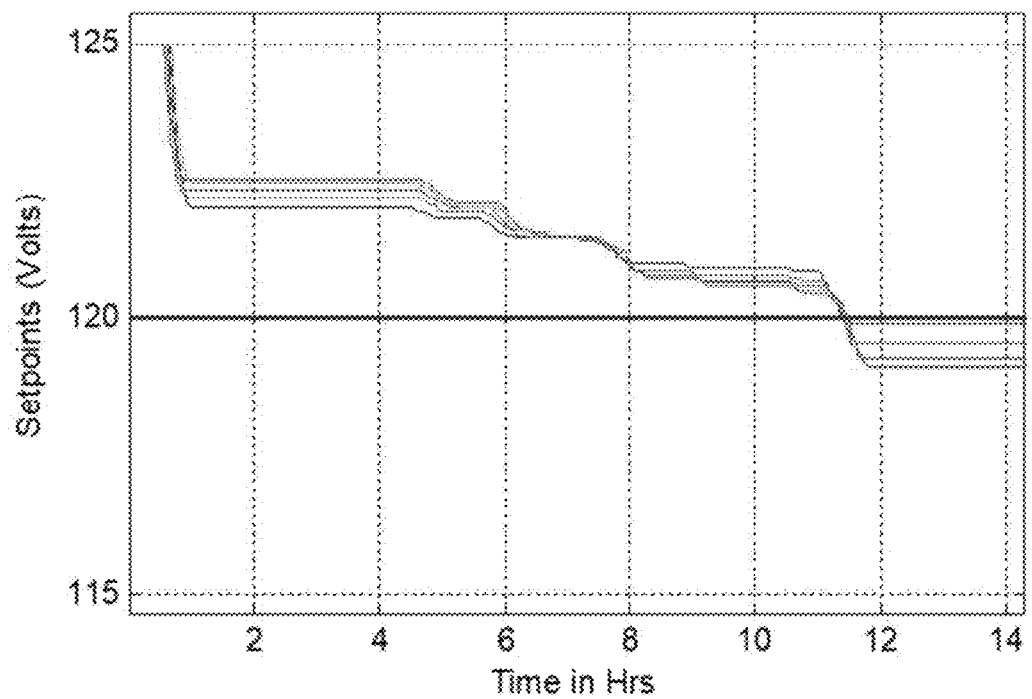
FIG. 22 is a graph illustrating setpoints of multiple GEDs converging to an example setpoint, in accordance with various embodiments of the present disclosure.

FIG. 22 is a graph illustrating setpoints of multiple GEDs converging to an example setpoint, in accordance with various embodiments of the present disclosure. The zoomed in view illustrates that the setpoint voltages reduce quickly at first and then slow down as the setpoint voltages approach the LTC setpoint, validating the slow stable asymptotic change in setpoint over time.

Figure 24:
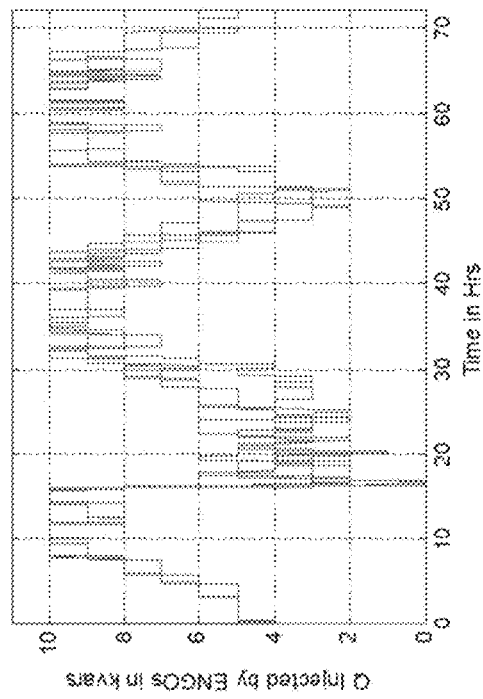
FIG. 24 is a graph illustrating VAR injection at multiple grid-edge devices, in accordance with various embodiments of the present disclosure.
Figure 23:
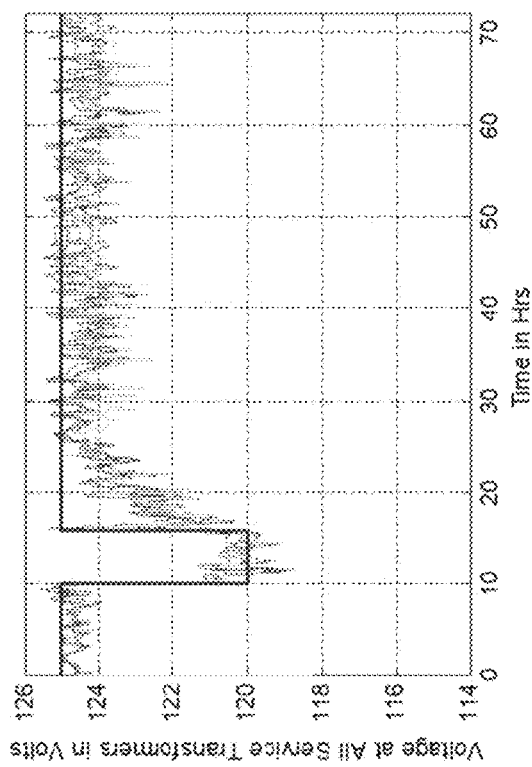
FIG. 23 is a graph illustrating voltages of multiple GEDs tracking an example setpoint, in accordance with various embodiments of the present disclosure.
Figure 25:
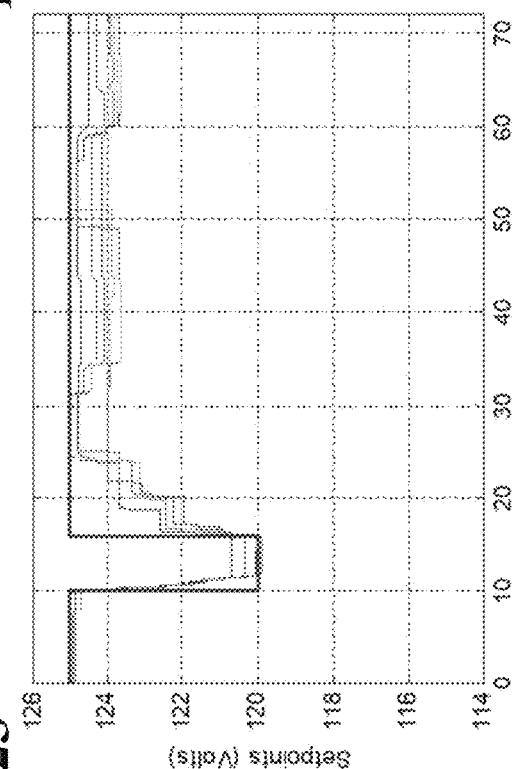
FIG. 25 is a graph illustrating grid-edge devices' setpoints tracking an example setpoint, in accordance with various embodiments of the present disclosure.

FIGS. 23, 24, and 25 are based on a fifth test case, where the LTC setpoint is changed from about 125V to about 120V between about 10 am and goes back to about 125 volts at about 6 pm on day 1. Day 2 and 3 do not have any LTC setpoint changes. The fifth test case tries to simulate the situation where the utility does not change the setpoint of the GEDs, and the presently disclosed technology dynamically adjusts the setpoint of the GEDs. FIG. 23 is a graph illustrating voltages of multiple GEDs tracking an example setpoint, in accordance with various embodiments of the present disclosure. As illustrated, when the LTC setpoint voltage reduces, all the node voltages reduce and so do the one or more GEDs' setpoints. The reduction in node voltages occurs rapidly. As the LTC setpoint is increased back, the setpoint voltage of GEDs also increase over time and asymptotically approach the LTC setpoints. The graph illustrates responsive setpoint tracking and validates the presently disclosed technology.

FIG. 24 is a graph illustrating VAR injection at multiple grid-edge devices, in accordance with various embodiments of the present disclosure. As illustrated, the VAR injection drops dramatically at about 18 hours when the setpoint returns to about 125 volts.

FIG. 25 is a graph illustrating grid-edge devices' setpoints tracking an example setpoint, in accordance with various embodiments of the present disclosure. The setpoint of individual GEDs and their variation is illustrated. All the GEDs achieve a setpoint close to the LTC very quickly in the first few hours. After the setpoint is changed, the GED setpoint is able to stay consistently around 124 volts and are able to maintain a setpoint close to the LTC setpoint of about 120 volts during the simulation. Nominal variations in individual setpoints are illustrated over the fourth test case with minimal functional impact on overall system performance.

Figure 26:
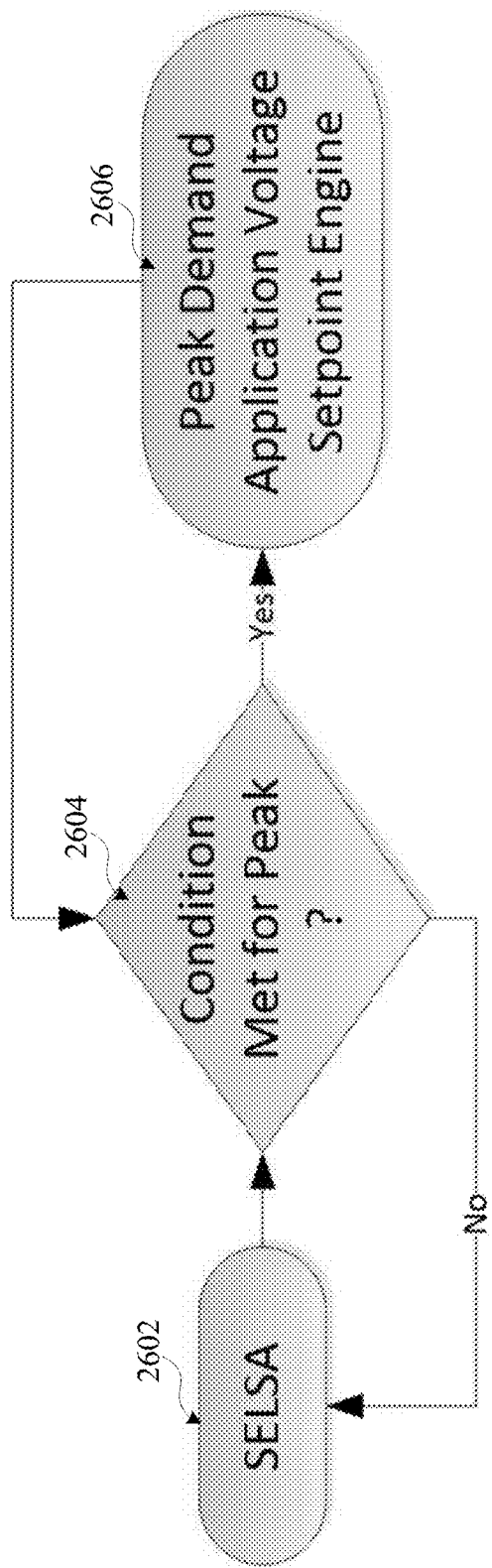
FIG. 26 is an operational flow chart illustrating example processes performed for determining whether GEDs are under peak demand, in accordance with various embodiments of the present disclosure.

FIG. 26 is an operational flow chart illustrating example processes performed for determining whether GEDs are under peak demand, in accordance with various embodiments of the present disclosure. At 2602, setpoint adjustment methods may be used, as described in at least FIGS. 2, 3, 4, 5, and 6.

At 2604, it may be determined whether the one or more GEDs are in a peak demand status.

At 2606, a peak demand equation may be applied, as will be described herein.

In embodiments, for peak demand, the setpoint voltage of the device may be a function of real power draw and time of day. If the real power draw during a certain time of the day starts to increase, then the setpoint voltage may be reduced. The change in setpoint voltage may not be gradual and may be abrupt. If the VAR change indicates that LTC has not dropped, the setpoint may be moved back up after some time interval. In one example, the time interval may be about ten minutes, fifteen minutes, thirty minutes, an hour, etc. If the LTC drops after some time, which may be about ten minutes fifteen minutes, thirty minutes, an hour, etc., then drop the setpoint back down.

Figure 27:
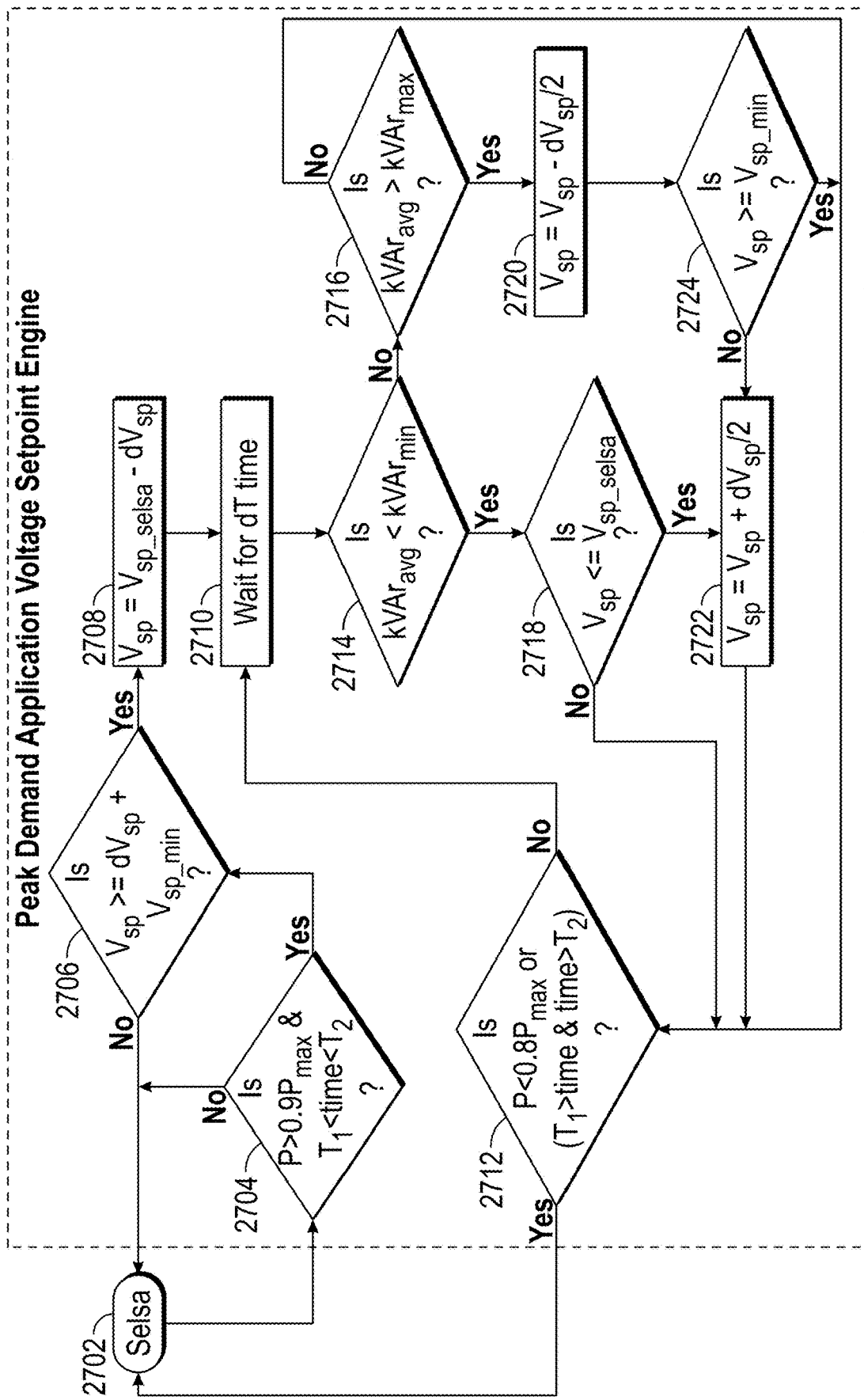
FIG. 27 is an operational flow chart illustrating example processes performed for autonomously regulating GEDs during peak demand, in accordance with various embodiments of the present disclosure.

FIG. 27 is an operational flow chart illustrating example processes performed for autonomously regulating GEDs during peak demand, in accordance with various embodiments of the present disclosure. At 2702, setpoint adjustment methods may be used, as described in at least FIGS. 2, 3, 4, 5, and 6.

At 2704, determine whether the current real power value is greater than about 90% of the maximum power value tracked by the GED over a time interval and determine whether a first time is less than a current time, and the current time is less than a second time.

At 2706, determine whether the current setpoint voltage is greater than or equal to a setpoint voltage threshold plus the minimum setpoint voltage threshold.

At 2708, adjust the current setpoint voltage using the setpoint adjustment methods described above (e.g., FIGS. 2, 3, 4, 5, and 6) minus the setpoint voltage threshold.

At 2710, wait for a time interval.

At 2712, determine whether the current real power value is less than about 80% of the maximum power value tracked by the GED over a time interval or whether the current time is less than a first time or greater than a second time.

At 2714, determine whether the average VAR value is less than a minimum VAR threshold value.

At 2716, determine whether the average VAR value is greater than a maximum VAR threshold value.

At 2718, determine whether the current setpoint voltage is less than or equal to a setpoint value generated by the setpoint adjustment methods described above (e.g., FIGS. 2, 3, 4, 5, and 6)

At 2720, adjust the current setpoint voltage to the current setpoint voltage minus a setpoint voltage threshold value divided by two.

At 2722, adjust the current setpoint voltage to the current setpoint voltage plus a setpoint voltage threshold value divided by two.

At 2724, determine whether the current setpoint voltage is greater than or equal to the minimum setpoint voltage threshold value.

For example, to help illustrate flowchart 2700, $T_1$ may be about 4 pm, $T_2$ may be about 6 pm, dT may be about 15 minutes, $V_{sp\_selsa}$ may be about 125V, $dV_{sp}$ may be about 3V, $kVAr_{min}$ may be about 3 kVAr, and $kVAr_{max}$ may be about 7 kVAr. The current time may be after 4 pm, the LTC setpoint may be reduced at 4:30 pm, and the real power, P, may be greater than about 90% of a maximum real power value measured by a GED over a time interval. At around 4:01 pm, $$V_{SP} = 125V - 3V = 122V$$

In this example, the GED may wait for about 15 minutes and record the average kVAr during this time, where $kVAr_{avg}$ may be about 2 kVAr. At about 4:15 pm, the new setpoint may be adjusted such that $$V_{SP} = 122V + 1.5V = 123.5V$$

The GED may wait another 15 minutes approximately and track the average kVAr during this time, where $kVAr_{avg}$ may be about 6 kVAr. At 4:30 pm, the setpoint may remain the same. The LTC setpoint may be changed by about 6V from about 126V to about 120V. The GED may wait for about 15 more minutes and track the average kVAr, where $kVAr_{avg}$ may be about 9 kVAr. At about 4:45 pm, the new ENGO setpoint may be $$V_{SP} = 123.5V - 1.5V = 122V$$

The new $kVAr_{avg}$ may be about 8 kVAr. At about 5:00 pm, the new ENGO setpoint may be $$V_{SP}=122V-1.5V=120.5V$$

After another 15 minutes approximately, during which the GED tracks the average kVAR, the new $kVAR_{avg}$ may be about 6 kVAr. At about 5:15 pm, the setpoint may remain the same as before until the LTC setpoint goes back up and/or the load reduces below about 80% of maximum. If the LTC setpoint goes up, the $kVAr_{avg}$ for that time interval may automatically reduce, and the new $V_{sp}$ may be gradually incremented towards the $V_{sp\_selsa}$.

In embodiments, the presently disclosed technology may account for different power factors. A power factor may be set for the one or more GEDs. A dynamically set power factor may be useful for industrial or commercial applications with power factor corrections or for PV applications where setting a lagging power factor may be required. Setting and/or adjusting the power factor for the one or more GEDs may impact the entire grid.

Figure 28:
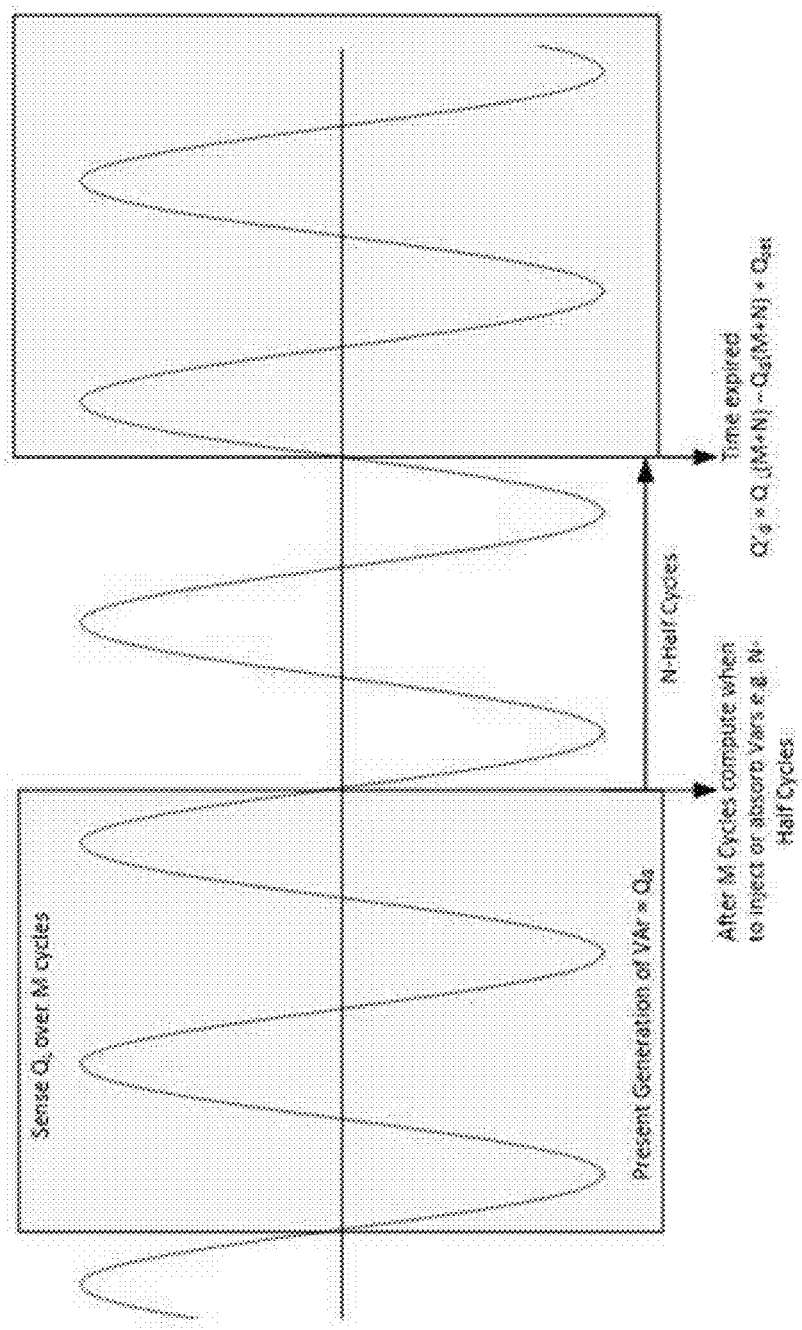
FIG. 28 is a graph illustrating VAR generation by multiple grid-edge devices, in accordance with various embodiments of the present disclosure.

FIG. 28 is a graph illustrating VAR generation by multiple grid-edge devices, in accordance with various embodiments of the present disclosure. The one or more GEDs may measure the reactive power consumed by the load, $Q_L(M)$, in addition to the self-generated reactive power, $Q_G(M)$, over M-line cycles. After M-line cycles have occurred, the GED may compute when to activate (i.e., inject or absorb) the required amount of reactive power. This timing can be a multiple of half-cycles. The timing may ensure that in case multiple GEDs are connected in shunt, they do not hunt with each other. The timing may be generated using a random process, may be bound between a minimum and maximum number, and may be inversely related to the magnitude of reactive power to be injected or absorbed. The Q needed to be injected/absorbed after 2M+N half-cycles may be given by $$Q_G'=Q_L(2M+N)-Q_G(2M+N)+Q_{set}$$

where $Q_L$ (2M+N) may represent an average load reactive power consumed over 2M+N half cycles, M may represent a positive integer, N may represent a positive integer, $Q_G$ (2M+N) may represent an average reactive power generated over 2M+N half cycles, and $Q_{set}$ may represent a reactive power required to maintain a certain input power factor. $Q_{set}$ can be used to set a fixed reactive power function (e.g., $Q_{set}$ may be 0 to ensure unity power factor). It should be appreciated that $Q_{set}$ may be any value.

In some embodiments, utilities could use one or more GEDs to provide a fixed amount of reactive power support for general distribution applications or for supporting transmission and generation. As the impact of reactive power may be dependent on the location on the circuit where it is applied, a variation of the above equation could be used to create re-organizing capacitor banks. $Q_{set}$ may be fixed for all GEDs and computed using a central head-end system. The central head end system can be used to program a different group of GEDs to be used to inject a fixed sum of reactive power.

In embodiments, the presently disclosed technology can be used for ultra-fast response flicker applications. For example, grain bin drying, saw mills, or irrigation pump loads may require an ultra-fast response to mitigate the effect of flicker. Flicker may be the effect of voltage fluctuations which may include variations of about 0.1% to about 7% of nominal voltage with frequencies less than about 25 Hz. The one or more GEDs can detect inrush current and respond quickly. For example, if inrush current is detected, the one or more GEDs can act within a cycle to balance out the VARs.

In some embodiments, flicker events may be induced from the grid side and may not directly be at the location where the GED is deployed. Current sensing may enhance the speed of response where current sensing is available. In general, voltage-based sensing may still be used to mitigate the flicker.

Figure 29:
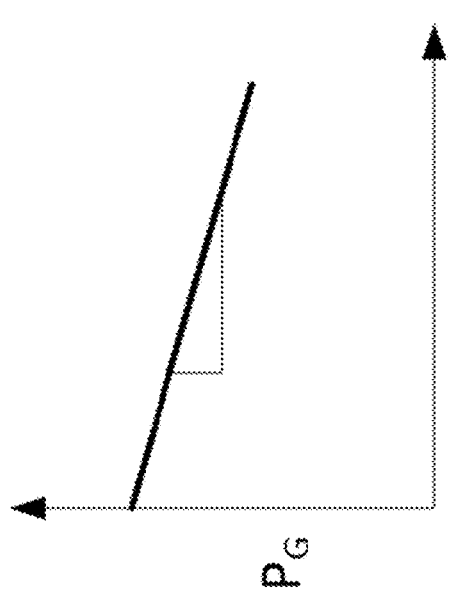
FIG. 29 is a graph illustrating a generator droop curve, in accordance with various embodiments of the present disclosure.

In embodiments, the voltage control aspect of the one or more GEDs can be used to control load and frequency at a bulk power system level. At the bulk power system level, frequency regulation support may be provided using governor control systems, frequency responsive spinning reserves, energy storage, frequency responsive demand response, and/or other methods. Fast response may be provided using governor control directly located at the turbine of generators and frequency responsive spinning reserves. In order to share power, generators may follow a droop relationship, or a "Droop Curve" as a function of frequency. FIG. 29 is a graph illustrating a generator droop curve, in accordance with various embodiments of the present disclosure. When the frequency increases the generated power reduces and vice versa.

Figure 30:
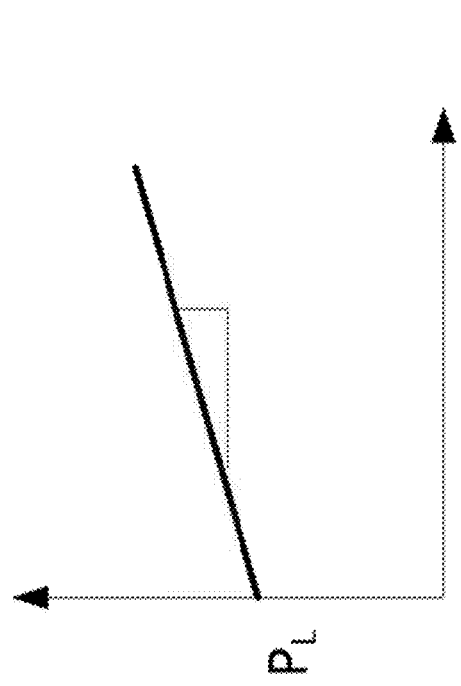
FIG. 30 is a graph illustrating a load ascend curve, in accordance with various embodiments of the present disclosure.

Similarly, an "Ascend Curve" relationship exists, where the power consumed or load increases as frequency increases and vice versa. FIG. 30 is a graph illustrating a load ascend curve, in accordance with various embodiments of the present disclosure.

Figure 31:
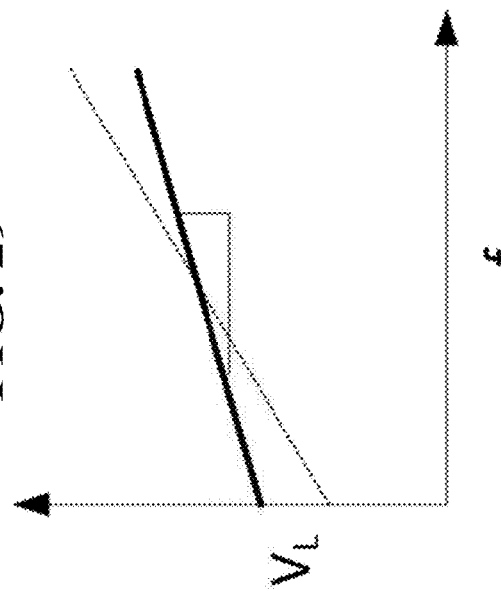
FIG. 31 is a graph illustrating a voltage-frequency ascend curve, in accordance with various embodiments of the present disclosure.

In distribution networks, change in load may be directly correlated to change in voltage. Change in load can be achieved by changing the voltage of the network. An ascend curve can be created for load voltage versus frequency. FIG. 31 is a graph illustrating a voltage-frequency ascend curve, in accordance with various embodiments of the present disclosure. A GED that can directly control the voltage of the load can participate in frequency regulation.

Figure 32:
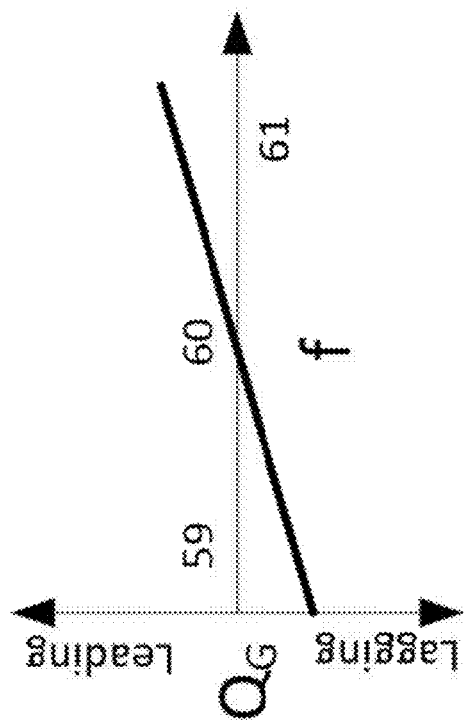
FIG. 32 is a graph illustrating a VAR-frequency ascend curve, in accordance with various embodiments of the present disclosure.

Reactive power (generated or absorbed) may be directly related to the voltage. A similar ascend curve can be created for reactive power generated from a GED as a function of frequency. FIG. 32 is a graph illustrating a VAR-frequency ascend curve, in accordance with various embodiments of the present disclosure. If frequency, f, increases, then VARs may be injected to increase voltage and therefore load, while if frequency decreases, then VARs may be absorbed to reduce voltage and therefore load. This linear relationship may vary as the frequency moves further away from nominal frequencies (e.g., about 60 Hz, about 50 Hz, etc.). The nominal frequency may include frequencies within a range of values away from a specific frequency value (e.g., 0.1 Hz, 0.5 Hz, 1 Hz, etc.)

The Ascend Curve may be defined by $$P_L=af+b$$

The correlation between $P_L$ and V may be where $$P_L = K_p V_L^\beta$$

$$\beta \in (0, 2] \text{ and } V_L = K_V (af + b)^{\frac{1}{\beta}}.$$

The frequency Ascend Curve may be defined by $$Q_G = \begin{bmatrix} K_Q(af+b)^{\frac{2}{\beta}}, f > 60 \\ -K_Q(af+b)^{\frac{2}{\beta}}, f < 60 \end{bmatrix}$$

In some embodiments, time delays of VAR injection can be randomized using the following equation:

$$T_d = \frac{K_T}{|f - f_{nom}|}, f > (f_{nom} + \varepsilon) \; \& \; f < (f_{nom} - \varepsilon)$$

where $K_T$ is a random number generated for each GED separately for each decision iteration. The randomized time delays may help avoid hunting between units connected in shunt on the same node. $F_{nom}$ may represent a frequency that is common in a region (e.g., 50 Hz, 60 Hz, etc.)

Figure 33:
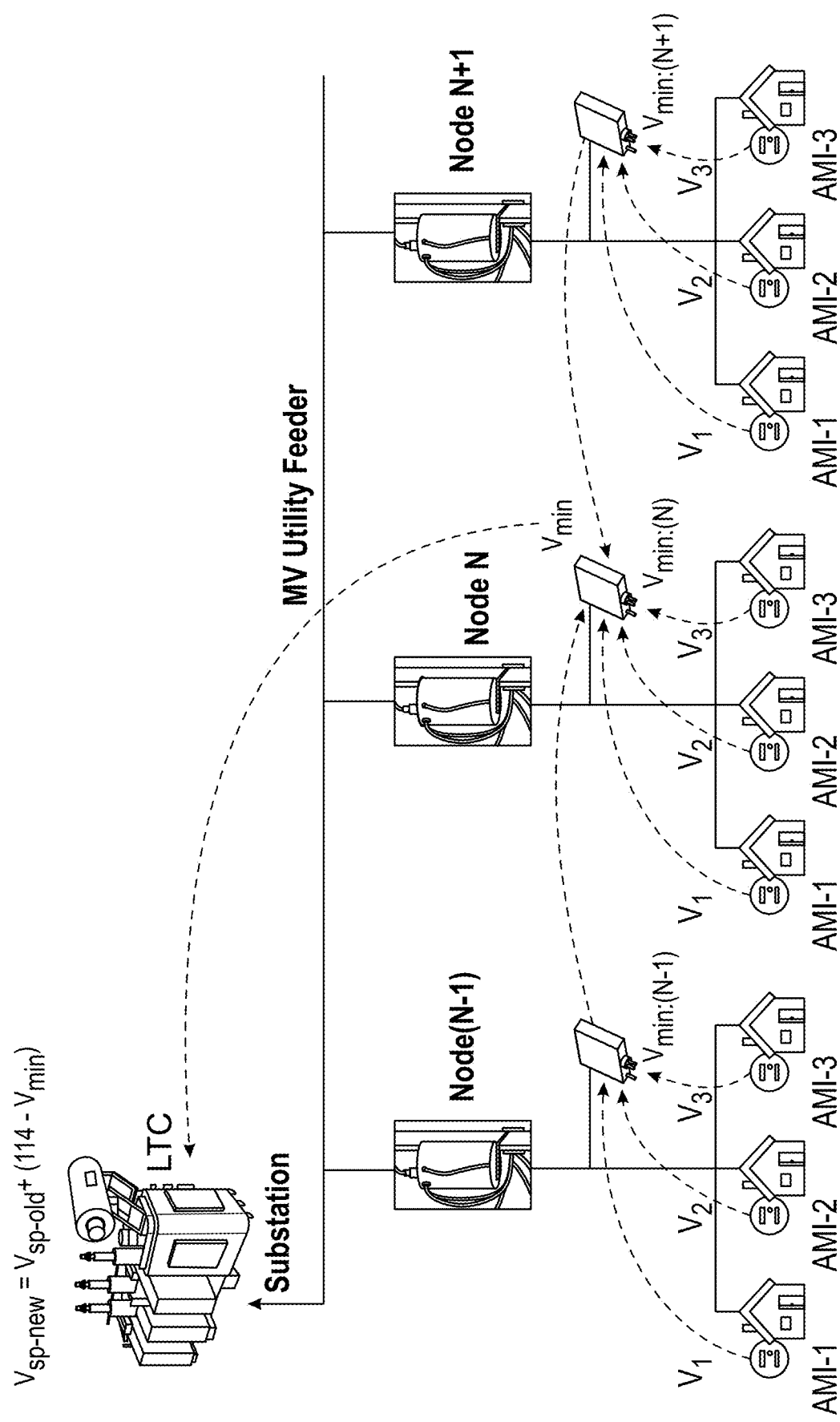
FIG. 33 is a diagram of an example system with multiple GEDs leveraging meshed communication, in accordance with various embodiments of the present disclosure.

FIG. 33 is a diagram of an example system with multiple GEDs leveraging meshed communication, in accordance with various embodiments of the present disclosure. In some embodiments, communication between GEDs and smart meters can be leveraged to compute a setpoint for upstream assets. Meshed communication between GEDs can be used to decide a minimum voltage and the voltage margin of the entire system. In this manner, a completely decentralized engine can be realized without the need for a central system to guide system setpoint voltage changes.

Figure 35:
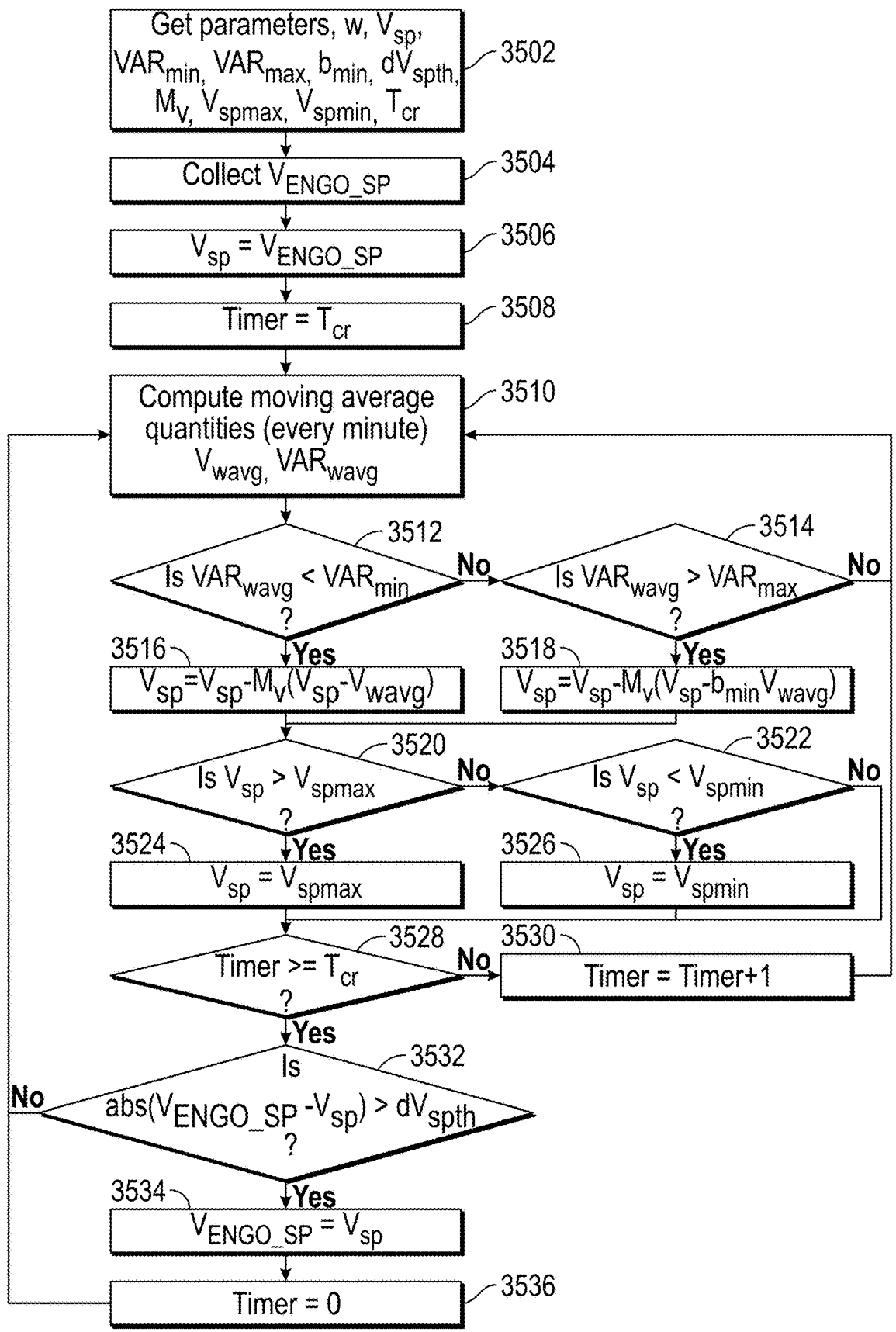
FIG. 35 is an operational flow diagram illustrating an example process for autonomously regulating GEDs, in accordance with various embodiments of the present disclosure.

FIG. 35 is an operational flow diagram illustrating an example process for autonomously regulating GEDs, in accordance with various embodiments of the present disclosure. 3502 may be substantially similar to 602, except for the grid parameter $T_{cr}$, which is the time threshold value to update or adjust the setpoint voltage.

At 3504, the first setpoint voltage may be collected.

At 3506, the setpoint voltage may be set to the first setpoint voltage.

At 3508, the time threshold may be set based on the time threshold value from 3502.

At 3510, the moving average quantities may be determined. For example, the average voltage value and the average VAR value may be determined. These may be determined on the scale of second, minute, hour, weeks, months, and other time intervals.

At 3512, the average VAR value may be compared to a minimum VAR threshold value. For example, it may be determined whether the average VAR value is less than a minimum VAR threshold value.

At 3514, based on the average VAR value being greater than or equal to a minimum VAR threshold value, the average VAR value may be compared to a maximum VAR threshold value. For example, it may be determined whether the average VAR value is greater than a maximum VAR threshold value.

At 3516, based on the average VAR value being less than a minimum VAR threshold value, the second setpoint voltage may be based on the first setpoint voltage, the speed of the response, and the average voltage value. For example, the second setpoint voltage may be defined by $$V_{sp} = V_{sp} - M_v(V_{sp} - V_{wavg})$$

where the grid parameters have substantially the same definitions as those described herein.

At 3518, based on the average VAR value being greater than or equal to a maximum VAR threshold value, the second setpoint voltage may be based on the first setpoint voltage, the speed of the response, the average voltage value, and a bias term. For example, the second setpoint voltage may be defined by $$V_{sp} = V_{sp} - M_v(V_{sp} - b_{min}V_{wavg})$$

where the grid parameters have substantially the same definitions as those described herein.

At 3520, the second setpoint voltage may be compared to a maximum voltage threshold value. For example, it may be determined whether the second setpoint voltage is greater than a maximum setpoint voltage value.

At 3522, based on the second setpoint voltage being less than or equal to a maximum setpoint voltage value, the second setpoint voltage may be compared to a minimum voltage threshold value. For example, it may be determined whether the second setpoint voltage is less than a minimum setpoint voltage value.

At 3524, based on the second setpoint voltage being greater than a maximum setpoint voltage value, the second setpoint voltage may be adjusted to the maximum setpoint voltage value.

At 3526, based on the second setpoint voltage being less than a minimum setpoint voltage value, the second setpoint voltage may be adjusted to the minimum setpoint voltage value.

At 3528, the elapsed time may be compared to the time threshold value.

At 3530, based on the elapsed time being less than a time threshold value, one minute may be added to the elapsed time.

At 3532, based on the elapsed time being greater than or equal to a time threshold value, a voltage threshold may be compared to a value based on the first setpoint voltage and the second setpoint voltage. For example, the comparison may be defined by $$|V_{ENGO\_SP} - V_{sp}| > dV_{spth}$$

where the grid parameters have substantially the same definitions as those described herein.

At 3534, based on the voltage threshold being less than a value based on the first setpoint voltage and the second setpoint voltage, the first setpoint voltage may be set to the second setpoint voltage.

At 3536, the time elapsed may be reset to 0.

In one example, the grid parameters may have the following default, minimum, and maximum values.

| Parameter | Default value | Min Value | Max Value |
| --- | --- | --- | --- |
| W | 15 | 5 | 60 |
| $M_v$ (Random) | 0.1 | 0.05 | 0.2 |
| $b_{min}$ | 1.01 | 1.00 | 1.02 |
| $VAR_{min}$ | 30% | 10% | 40% |
| $VAR_{max}$ | 80% | 70% | 90% |
| $dV_{spth}$ (120Vbase) | 0.25 | 0.125 | 1 |
| $V_{spmin}$ (120Vbase) | 114 | 110 | 116 |
| $V_{spmax}$ (120Vbase) | 126 | 123 | 127 |
| $T_{cr}$ | 15 | 5 | 720 |

W may represent the window size (e.g., in minutes) to compute average values (e.g., $VAR_{wavg}$ or $V_{wavg}$). M may represent the speed of response. $b_{min}$ may represent the bias term. $VAR_{min}$ may represent a minimum VAR threshold value defined as a percentage value. For example, based on the $VAR_{wavg}$ being lower than the $VAR_{min}$, the presently disclosed technology may be activated. $VAR_{max}$ may represent a maximum VAR threshold value defined as a percentage value. Based on the $VAR_{wavg}$ being higher than the $VAR_{max}$, the presently disclosed technology may be activated. $dV_{spth}$ may represent a noise cancellation term or a threshold voltage value in V. For example, based on a difference of a computed GED setpoint voltage, $V_{ENGO\_SP}$, and the current setpoint voltage, $V_{sp}$ is more than this term, or voltage threshold, the GED setpoint voltage may be set to the new value; otherwise, a previous value may be kept. $V_{spmin}$ may represent the minimum allowable set-point in V. Based on the determining a setpoint voltage lower than the $V_{spmin}$, $V_{spmin}$ may be used as the new setpoint voltage. $V_{spmax}$ may represent the maximum allowable setpoint voltage in V. Based on the determining a setpoint voltage higher than the $V_{spmax}$, $V_{spmax}$ may be used as the new setpoint voltage. $T_{cr}$ may represent the time threshold for changing the GED setpoint voltage in minutes. $VAR_{wavg}$ may represent the average GED VAR injection over W minutes in kVARs. $V_{wavg}$ may represent the average GED voltage over W minutes in V. This may be a random parameter for each GED. $V_{sp}$ may represent the setpoint voltage in V determined every minute, or other time interval, by the presently disclosed technology. The setpoint voltage may not be pushed to GED at the moment it is determined. The setpoint voltage may be pushed to the GED based on one or more criteria (e.g., time criteria and noise criteria) being met. $V_{ENGO\_SP}$ may represent the GED setpoint voltage that is being currently followed by the GED in V.

Figure 36:
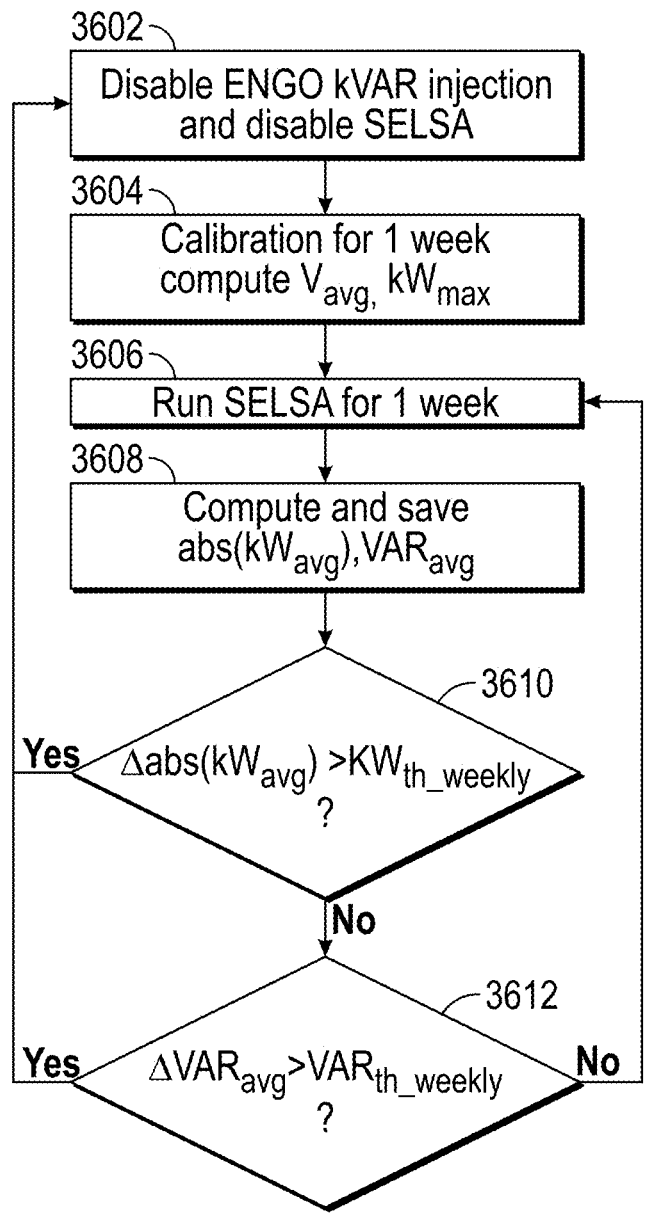
FIG. 36 is an operational flow diagram illustrating an example process for autonomously regulating GEDs, in accordance with various embodiments of the present disclosure.

FIG. 36 is an operational flow diagram illustrating an example process for calibrating the presently disclosed technology, in accordance with various embodiments of the present disclosure. At 3602, the GED VAR injection and adjustment of the setpoint voltage may be disabled.

At 3604, the average voltage value and the maximum real power flow measured may be determined over a time interval. The time interval can be on the scale of minutes, hours, days, weeks, or months. In one example, it may be a week.

At 3606, GEDs may be run for a week.

At 3608, the absolute value of the average real power flow and the average VAR value may be determined and/or stored.

At 3610, the change in the absolute value of the average real power flow may be compared to a change in real power flow threshold value. For example, it may be determined whether the change in the absolute value of the average real power flow is greater than the change in real power flow threshold value. Based on the absolute value of the average real power flow being greater, the GED VAR injection and adjustment of the setpoint voltage may be disabled. In some embodiments, based on the absolute value of the average real power flow being greater, the presently disclosed technology may be recalibrated, which may include computing a new maximum real power flow and average voltage values to generate the second setpoint voltage. In embodiments, the time frame to measure the average real power flow may be a week. For example, the present week's average real power flow may be compared to the previous week's average real power flow. The difference between these values, or the change in the absolute value of the average real power flow, may be compared to the real power flow threshold value. In some embodiments, the change in real power flow threshold value may be between about 10% to about 35% between time periods, though it should be appreciated that other values are appropriate in different embodiments.

At 3612, the change in average VAR values may be compared to a VAR threshold value based on the absolute value of the average real power flow being less than the real power flow threshold value. The change in average VAR values may compare the present week's average VAR values to the previous week's average VAR values. For example, it may be determined whether the absolute value of the average VAR value is greater than the VAR threshold value. Based on the absolute value of the average VAR value being greater, the GED VAR injection and adjustment of the setpoint voltage may be disabled. Based on the absolute value of the average VAR value being less than the VAR threshold value, the GEDs may be run for a week. The VAR threshold value may be between about 10% to about 35% between time periods, though it should be appreciated that other values are appropriate in different embodiments. This VAR threshold may be used to determine whether the presently disclosed technology should be recalibrated.

In one example, the grid parameters may have the following default, minimum, and maximum values.

| Parameter/Constant | Default value | Min Value | Max Value |
|---|---|---|---|
| $VAR_{th\_weekly}$ (in %) | 25% | 5% | 50% |
| $KW_{th\_weekly}$ (in %) | 25% | 5% | 50% |

$V_{avg}$ may refer to an average voltage in V measured by GED over a time interval without engaging control effort (i.e., no VAR injection). $kW_{max}$ may refer to a maximum real power flow in kW measured at the transformer or at the point of measurement over a time interval. $kW_{avg}$ may refer to an average kW flow measured at the transformer or at the point of measurement over a time interval. $VAR_{avg}$ may refer to an average kVAR injection by GEDs over a time interval. $kW_{th\_weekly}$ may refer to a threshold given to change in kW flow measured in % at the transformer or at the point of measurement over a time interval. $VAR_{th\_weekly}$ may refer to a threshold value given to change in kVARs measured in % by the GED over a time interval.

Figure 37:
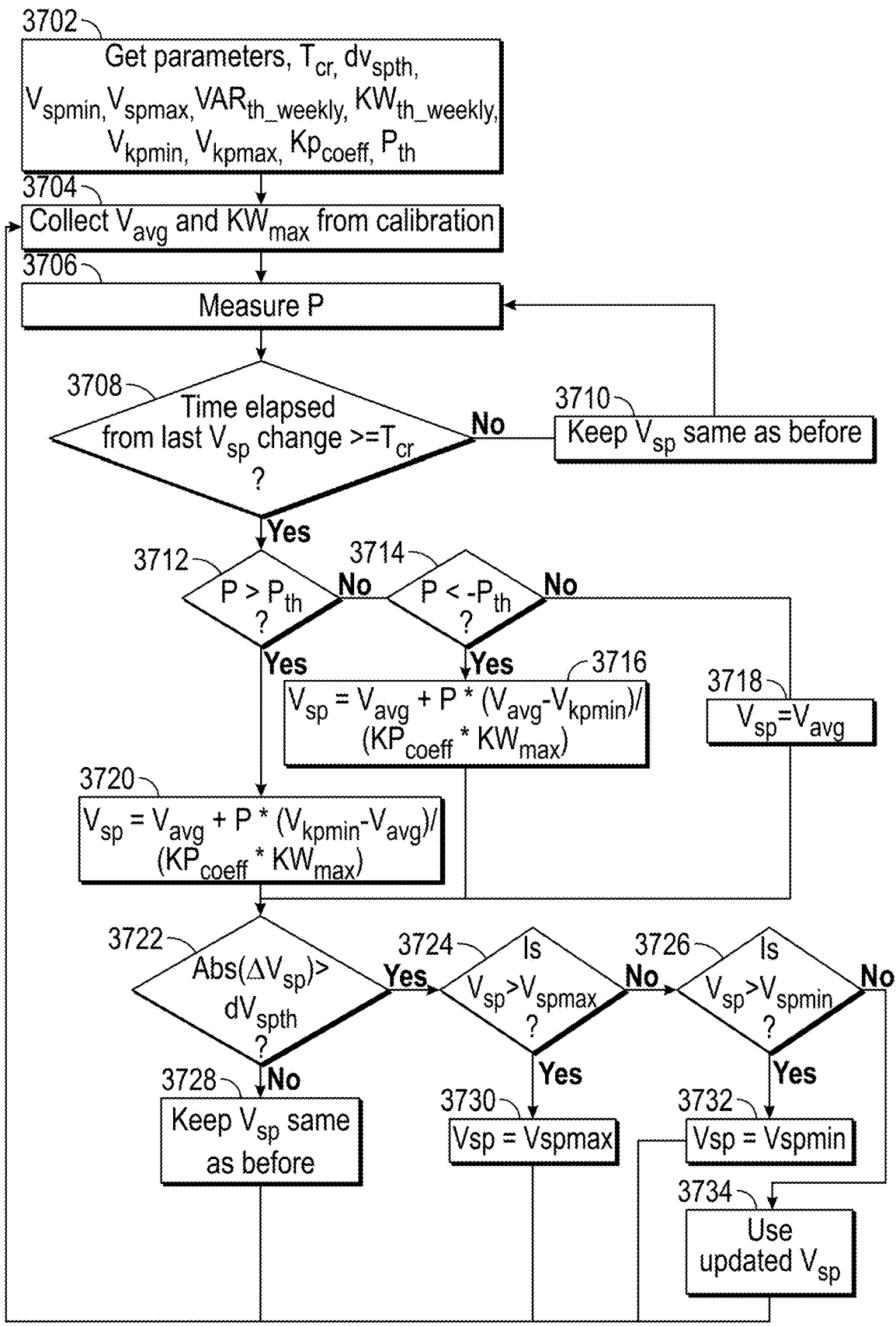
FIG. 37 is an operational flow diagram illustrating an example process for autonomously regulating GEDs, in accordance with various embodiments of the present disclosure.

FIG. 37 is an operational flow diagram illustrating an example process for autonomously regulating GEDs, in accordance with various embodiments of the present disclosure. 3702 may include getting one or more grid parameters. The grid parameters may include one or more of $T_{cr}$, $dV_{spth}$, $V_{spmin}$, $V_{spmax}$, $VAR_{th\_weekly}$, $KW_{th\_weekly}$, $V_{kpmin}$, $V_{kpmax}$, $Kp_{coeff}$, and $P_{th}$, as described herein.

At 3704, the average voltage value and maximum real power flow may be collected from a calibration measurement, substantially similar to that discussed in FIG. 36.

At 3706, real power flow, P, may be measured.

At 3708, the time elapsed from the last setpoint voltage change is compared to the time threshold. For example, it may be determined whether the time elapsed is greater than or equal to the time threshold.

At 3710, the setpoint voltage may be kept at the current setpoint voltage based on the time elapsed being less than the time threshold.

At 3712, the real power flow may be compared to a power flow threshold value based on the time elapsed being greater than or equal to the time threshold. For example, it may be determined whether the real power flow is greater than the power flow threshold value.

At 3714, the real power flow may be compared to the power flow threshold again based on the real power flow being greater than the power flow threshold value. For example, it may be determined whether the real power flow is less than a negative value of the power flow threshold value.

At 3716, based on the real power flow being less than a negative value of the power flow threshold value, the second setpoint voltage may be based on an average voltage value, the real power flow, a maximum power flow threshold value, a minimum setpoint voltage value, and a power flow coefficient. For example, the second setpoint voltage may be defined by $$V_{sp} = V_{avg} + P * \frac{V_{avg} - V_{kpmin}}{Kp_{coeff} * kW_{max}}$$

where $V_{avg}$ may represent the average voltage in V measured by GED over a time interval without engaging control effort (i.e. no VAR injection), P may represent the real power flow in kW at a time (a positive P may represent no reverse power flow while a negative P may represent generation and reverse power flow, $V_{kpmin}$ may represent a lower voltage threshold used to compute the difference in average voltage to adjust the setpoint, $Kp_{coeff}$ may represent a scale factor that is applied to the maximum real power flow measured, and $kW_{max}$ may represent the maximum real power flow in kW measured at the transformer or at the point of measurement over the time interval.

At 3718, based on the real power flow being greater than or equal to the negative power flow threshold value, the second setpoint voltage may be based on the average voltage value. For example, the second setpoint voltage may be equal to the average voltage value.

At 3720, based on the real power flow being greater than or equal to the negative power flow threshold value, the second setpoint voltage may be based on an average voltage value, the real power flow, a maximum power flow threshold value, a maximum setpoint voltage value, and a power flow coefficient. For example, the second setpoint voltage may be defined by $$V_{sp} = V_{avg} + P * \frac{V_{kpmax} - V_{avg}}{Kp_{coeff} * kW_{max}}$$

where the grid parameters may be substantially similar to those described herein, except that $V_{kpmax}$ may represent an upper voltage threshold used to compute the difference in average voltage to adjust the setpoint.

At 3722, the second setpoint voltage may be compared to a voltage threshold value. For example, it may be determined whether the absolute value between the second setpoint voltage and the first setpoint voltage is greater than the voltage threshold value.

At 3724, based on the absolute value between the first setpoint voltage and the second setpoint voltage being greater than the voltage threshold value, the first setpoint voltage may be compared to a maximum setpoint voltage value. For example, it may be determined whether the first setpoint voltage is greater than the maximum setpoint voltage value.

At 3726, based on the first setpoint voltage being less than or equal to a maximum setpoint voltage value, the first setpoint voltage may be compared to a minimum setpoint voltage value. For example, it may be determined whether the first setpoint voltage is less than the minimum setpoint voltage value.

At 3728, based on the absolute value between the first setpoint voltage and the second setpoint voltage being less than or equal to the voltage threshold value, the first setpoint voltage may stay the same.

At 3730, based on the first setpoint voltage being greater than the maximum setpoint voltage value, the first setpoint voltage may be set to the maximum setpoint voltage value.

At 3732, based on the first setpoint voltage being less than the minimum setpoint voltage value, the first setpoint voltage may be set to the minimum setpoint voltage value.

At 3734, based on the first setpoint voltage being greater than or equal to the minimum setpoint voltage value, the first setpoint voltage may be set to the second setpoint voltage.

In one example, the grid parameters may have the following default, minimum, and maximum values.

| Parameter/Constant | Default value | Min Value | Max Value |
|---|---|---|---|
| $T_{cr}$ | 15 | 5 | 720 |
| $dV_{spth}$ (120Vbase) | 0.25 | 0.125 | 1 |
| $V_{spmin}$ (120Vbase) | 114 | 110 | 116 |
| $V_{spmax}$ (120Vbase) | 126 | 123 | 127 |
| $VAR_{th\_weekly}$ (in %) | 25% | 5% | 50% |
| $KW_{th\_weekly}$ (in %) | 25% | 5% | 50% |
| $V_{kpmin}$ (120Vbase) | 114 | 110 | 116 |
| $V_{kpmax}$ (120Vbase) | 126 | 123 | 127 |
| $Kp_{coeff}$ | 1.25 | 1.00 | 1.50 |
| $P_{th}$ (kW) | 0.5 | 0.05 | 1 |

$T_{cr}$ may represent a time threshold in minutes for changing the GED setpoint voltage. $dV_{spth}$ may represent a noise cancellation term or a threshold voltage value in V. For example, based on a difference of a computed GED setpoint voltage $V_{ENGO\_SP}$, and the current setpoint voltage, $V_{sp}$ is more than this term, or voltage threshold, the GED setpoint voltage may be set to the new value; otherwise, a previous value may be kept. $V_{spmin}$ may represent the minimum allowable set-point in V. Based on determining a setpoint voltage lower than the $V_{spmin}$, $V_{spmin}$ may be used as the new setpoint voltage. $V_{spmax}$ may represent the maximum allowable setpoint voltage in V. Based on the determining a setpoint voltage higher than the $V_{spmax}$, $V_{spmax}$ may be used as the new setpoint voltage. $VAR_{sth\_weekly}$ may represent a threshold given to change in kVARs measured in % by the ENGO over a time interval. $kW_{th\_weekly}$ may represent a threshold given to change in kW flow measured in % at the transformer or at the point of measurement over a time interval. $P_{th}$ may represent a deadband in kW flow to prevent oscillation of Vsp when kW flow is close to 0. For example, the setpoint voltage may not change based on the absolute value of the real power flow being less than this quantity.

Accordingly, various embodiments are directed to using one or more techniques discussed above to allow GEDs to autonomously regulate voltage and VAR control.

Figure 34:
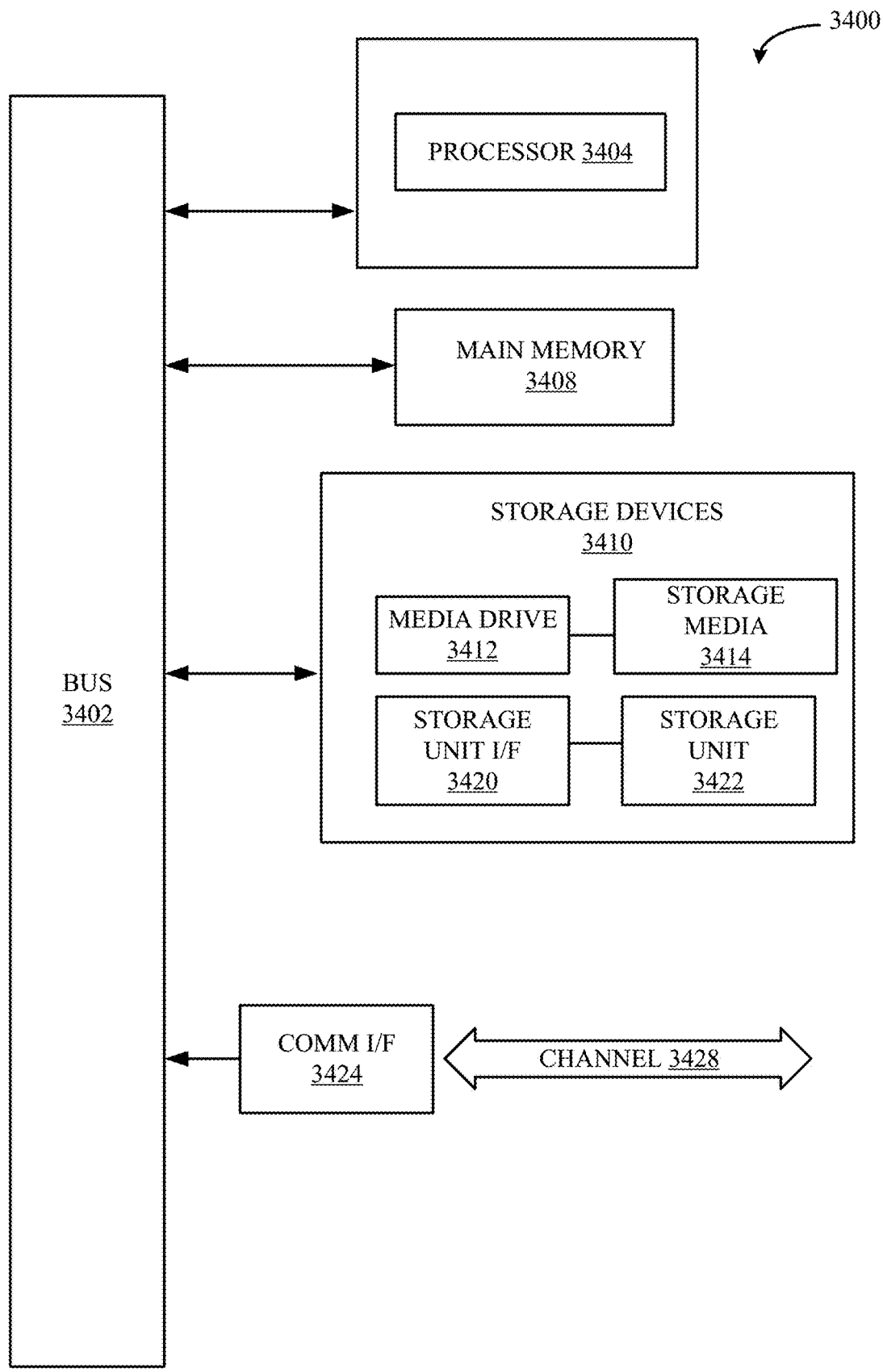
FIG. 34 illustrates an example computing component that may be used to implement features of various embodiments of the disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 34 which may be used to implement various features of the system and methods disclosed herein. Various embodiments are described in terms of this example-computing component 3400. After reading this description, it will become apparent to a person skilled in the relevant art how to implement the application using other computing components or architectures.

Referring now to FIG. 34, computing component 3400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing component 3400 may be one embodiment of the data acquisition and control component of FIG. 34, a GED, and/or one or more functional elements thereof. Computing component 3400 might also represent computing capabilities embedded within or otherwise available to a given device. For example, a computing component might be found in other electronic devices such as, for example navigation systems, portable computing devices, and other electronic devices that might include some form of processing capability.

Computing component 3400 might include, for example, one or more processors, controllers, control components, or other processing devices, such as a processor 3404. Processor 3404 might be implemented using a general-purpose or special-purpose processing engine such as, for example, a microprocessor, controller, or other control logic. In the illustrated example, processor 3404 is connected to a bus 3402, although any communication medium can be used to facilitate interaction with other components of computing component 3400 or to communicate externally.

Computing component 3400 might also include one or more memory components, simply referred to herein as main memory 3408. For example, preferably random access memory (RAM) or other dynamic memory might be used for storing information and instructions to be executed by processor 3404. Main memory 3408 might also be used for storing temporary variables or other intermediate information during execution of instructions to be executed by processor 3404. Computing component 3400 might likewise include a read only memory ("ROM") or other static storage device coupled to bus 3402 for storing static information and instructions for processor 3404.

The computing component 3400 might also include one or more various forms of storage device 3410, which might include, for example, a media drive 3412 and a storage unit interface 3420. The media drive 3412 might include a drive or other mechanism to support fixed or removable storage media 3414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 3414 might include, for example, a hard disk, an integrated circuit assembly, magnetic tape, cartridge, optical disk, a CD or DVD, or other fixed or removable medium that is read by, written to or accessed by media drive 3412. As these examples illustrate, the storage media 3414 can include a computer usable storage medium having stored therein computer software or data.

In alternative embodiments, storage device 3410 might include other similar instrumentalities for allowing computer programs or other instructions or data to be loaded into computing component 3400. Such instrumentalities might include, for example, a fixed or removable storage unit 3422 and an interface 3420. Examples of such storage units 3422 and interfaces 3420 can include a program cartridge and cartridge interface, a removable memory (for example, a flash memory or other removable memory component) and memory slot, a PCMCIA slot and card, and other fixed or removable storage units 3422 and interfaces 3420 that allow software and data to be transferred from the storage unit 3422 to computing component 3400.

Computing component 3400 might also include a communications interface 3424. Communications interface 3424 might be used to allow software and data to be transferred between computing component 3400 and external devices. Examples of communications interface 3424 might include a modem or softmodem, a network interface (such as an Ethernet, network interface card, WiMedia, IEEE 802.XX or other interface), a communications port (such as for example, a USB port, IR port, RS342 port Bluetooth® interface, or other port), or other communications interface. Software and data transferred via communications interface 3424 might typically be carried on signals, which can be electronic, electromagnetic (which includes optical) or other signals capable of being exchanged by a given communications interface 3424. These signals might be provided to communications interface 3424 via a channel 3428. This channel 3428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 3408, storage unit 3420, media 3414, and channel 3428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 3400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time interval or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for autonomously regulating grid edge devices (GEDs), the method being implemented in a computer system comprising a non-transient electronic storage and one or more physical computer processors, the computer-implemented method comprising:

obtaining, from the non-transient electronic storage, a first setpoint voltage for a GED, wherein the GED is implemented on a secondary side of a distribution line providing electricity for a consumer;

generating, with the one or more physical computer processors, an average VAR value based at least in part on VARs generated by the GED over a first time interval;

generating, with the one or more physical computer processors, an average voltage value based at least in part on voltage received by the GED over the first time interval; and adjusting, with the one or more physical computer processors, the first setpoint voltage to a second setpoint voltage based at least in part on a difference between the average voltage value and the first setpoint voltage exceeding a voltage threshold value and a comparison between the average VAR value and one or more of: a maximum VAR threshold value or a minimum VAR threshold value.

2. The computer-implemented method of claim 1, wherein the GED comprises a sensor measuring an environmental parameter.

3. The computer-implemented method of claim 2, wherein the sensor comprises one or more of: a clock, a temperature sensor, a current sensor, a VAR sensor, or a voltage sensor.

4. The computer-implemented method of claim 1, wherein the GED comprises one or more of a photovoltaic, a VAR device, an inverter, or an energy storage device.

5. The computer-implemented method of claim 1, wherein the second setpoint voltage is bounded by a minimum voltage threshold value and a maximum voltage threshold value.

6. The computer-implemented method of claim 1, wherein adjusting the first setpoint voltage to the second setpoint voltage comprises:

applying, with the one or more physical computer processors, a first equation to determine the second setpoint voltage when the average VAR value is greater than the maximum VAR threshold value, wherein the first equation is defined by $$\frac{dV_{sp}}{dt} = -M_v(V_{sp} - V_{wavg})$$

where $$\frac{dV_{sp}}{dt}$$

represents a rate of change of the first setpoint voltage as a function of time, $M_v$ represents a speed of VAR response to the second setpoint voltage, $V_{sp}$ represents the first setpoint voltage, and $V_{wavg}$ represents the average voltage value.

7. The computer-implemented method of claim 1, wherein adjusting the first setpoint voltage to the second setpoint voltage comprises:

applying, with the one or more physical computer processors, a second equation to determine the second setpoint voltage when the average VAR value is less than the minimum VAR threshold value, wherein the second equation is defined by $$\frac{dV_{sp}}{dt} = -M_v(V_{sp} - b_{min}V_{wavg})$$

where $$\frac{dV_{sp}}{dt}$$

represents a rate of change of the first setpoint voltage as a function of time, $M_v$ represents a speed of VAR response to the second setpoint voltage, $V_{sp}$ represents the first setpoint voltage, $b_{min}$ represents a bias term to improve reducing the average VAR value, and $V_{wavg}$ represents the average voltage value.

8. The computer-implemented method of claim 1, further comprising:
based at least in part on a current real power value and a current time, adjusting, with the one or more physical computer processors, the second setpoint voltage to a third setpoint voltage based at least in part on the second setpoint voltage and a setpoint voltage threshold value.

9. The computer-implemented method of claim 8, further comprising, when the third setpoint voltage is greater than or equal to about the setpoint voltage threshold value plus a minimum setpoint voltage threshold, adjusting, with the one or more physical computer processors, the third setpoint voltage to a fourth setpoint voltage, based at least in part on the third setpoint voltage and the setpoint voltage threshold value.

10. The computer-implemented method of claim 8, further comprising, when the average VAR value is less than the minimum VAR threshold value and the average voltage value is less than the third setpoint voltage, adjusting, with the one or more physical computer processors, the third setpoint voltage to a fourth setpoint voltage, wherein the fourth setpoint voltage is based at least in part on the third setpoint voltage minus half of the setpoint voltage threshold value.

11. A computer-implemented method for autonomously regulating grid edge devices (GEDs), the method being implemented in a computer system comprising a non-transient electronic storage and one or more physical computer processors, the computer-implemented method comprising:
obtaining, from the non-transient electronic storage, a first setpoint voltage for a GED, wherein the GED is implemented on a secondary side of a distribution line providing electricity for a consumer;
generating, with the one or more physical computer processors, an average real power flow value based at least in part on power received by the GED over a time interval;
generating, with the one or more physical computer processors, an average voltage value based at least in part on voltage received by the GED over the time interval; and
adjusting, with the one or more physical computer processors, the first setpoint voltage to a second setpoint voltage based at least in part on a change in real power as compared to a first threshold value and a change in an average VAR value as compared to a second threshold value.

12. The computer-implemented method of claim 11, wherein the GED comprises a sensor measuring an environmental parameter.

13. The computer-implemented method of claim 12, wherein the sensor comprises one or more of: a clock, a temperature sensor, a current sensor, a VAR sensor, or a voltage sensor.

14. The computer-implemented method of claim 11, wherein the GED comprises one or more of: a photovoltaic, a VAR device, a unified power flow controller (UPFC) device, an inverter, or an energy storage device.

15. The computer-implemented method of claim 11, wherein the second setpoint voltage is bounded by an upper threshold based at least in part on a low voltage usage value and a lower threshold based at least in part on a high voltage usage value.

16. The computer-implemented method of claim 11, wherein adjusting the first setpoint voltage to the second setpoint voltage comprises:
applying, with the one or more physical computer processors, a first equation to determine the second setpoint voltage when the change in real power is positive, wherein the first equation is defined by $$V_{sp} = V_{avg} + \frac{P}{kW_{avg}} K_{p+}$$

where $V_{sp}$ represents the second setpoint voltage, $V_{avg}$ represents the average voltage value, P represents a real power flow, $kW_{avg}$ represents an average real power flow, and $$K_{p+} = \left(\frac{126 - V_{avg}}{1.25 \times kWmax}\right) kW_{avg}.$$

17. The computer-implemented method of claim 11, wherein adjusting the first setpoint voltage to the second setpoint voltage comprises:
applying, with the one or more physical computer processors, a second equation to determine the second setpoint voltage when the change in real power is negative, wherein the second equation is defined by $$V_{sp} = V_{avg} + \frac{P}{kW_{avg}} K_{p-}$$

where $V_{sp}$ represents the second setpoint voltage, $V_{avg}$ represents the average voltage value, P represents a real power flow, $kW_{avg}$ represents an average real power flow, and $$K_{p-} = \left(\frac{V_{avg} - 114}{1.25 \times kWmax}\right) kW_{avg}.$$

18. A computer-implemented method for autonomously regulating grid edge devices (GEDs), the method being implemented in a computer system comprising a non-transient electronic storage and one or more physical computer processors, the computer-implemented method comprising:
obtaining, from the non-transient electronic storage, a first setpoint voltage for a GED;
generating, with the one or more physical computer processors, an average VAR value based at least in part on VARs generated by the GED over a time interval;
adjusting, with the one or more physical computer processors, the first setpoint voltage to a second setpoint voltage based at least in part on at least one of: an average voltage value, an average current value, or an average real power flow value and a comparison between the average VAR value and one or more of: a maximum VAR threshold value or a minimum VAR threshold value; and adjusting, with the one or more physical computer processors, the second setpoint voltage to a third setpoint voltage based at least in part on a change in the average VAR value.

19. The computer-implemented method of claim 18, wherein the GED comprises one or more of: a photovoltaic, a VAR device, a unified power flow controller (UPFC) device, an inverter, or an energy storage device.

20. The computer-implemented method of claim 18, wherein adjusting the first setpoint voltage to the second setpoint voltage comprises applying, with the one or more physical computer processors, a first equation to determine the second setpoint voltage when the average VAR value is greater than the maximum VAR threshold value, wherein the first equation is defined by $$\frac{dV_{sp}}{dt} = -M_v(V_{sp} - V_{wavg})$$

where $$\frac{dV_{sp}}{dt}$$

represents a rate of change of the first setpoint voltage as a function of time, $M_v$ represents a speed of VAR response to the second setpoint voltage, $V_{sp}$ represents the first setpoint voltage, and $V_{wavg}$ represents the average voltage value.

* * * * *